United States Patent
D'Amico et al.

(10) Patent No.: US 11,446,663 B2
(45) Date of Patent: Sep. 20, 2022

(54) METHOD AND APPARATUS FOR ISOLATING AND DETECTING BIOLOGICAL AND OTHER PARTICLES

(71) Applicant: Advanced Electrofluidic Systems, LLC, Houston, TX (US)

(72) Inventors: Lorenzo D'Amico, Houston, TX (US); Peter Russell Charles Gascoyne, Houston, TX (US)

(73) Assignee: Aincobio LLC, Syracuse, NY (US)

( * ) Notice: Subject to any disclaimer, the term of this patent is extended or adjusted under 35 U.S.C. 154(b) by 873 days.

(21) Appl. No.: 16/329,830

(22) PCT Filed: Jan. 22, 2019

(86) PCT No.: PCT/US2019/014445
§ 371 (c)(1),
(2) Date: Mar. 1, 2019

(87) PCT Pub. No.: WO2019/147525
PCT Pub. Date: Aug. 1, 2019

(65) Prior Publication Data
US 2021/0331166 A1    Oct. 28, 2021

Related U.S. Application Data

(60) Provisional application No. 62/622,391, filed on Jan. 26, 2018.

(51) Int. Cl.
*B01L 3/00*    (2006.01)
*B01L 7/00*    (2006.01)
(Continued)

(52) U.S. Cl.
CPC .......... *B01L 3/502761* (2013.01); *B01L 7/00* (2013.01); *B03C 5/005* (2013.01); *B03C 5/026* (2013.01);
(Continued)

(58) Field of Classification Search
CPC ..... B01L 2200/0652; B01L 2200/0673; B01L 2200/0689; B01L 2300/042;
(Continued)

(56) References Cited

U.S. PATENT DOCUMENTS 5,338,435 A    8/1994  Betts et al.
5,593,559 A *  1/1997  Wiktorowicz ... G01N 27/44743
                                                  204/453
(Continued)

FOREIGN PATENT DOCUMENTS

EP    1254372    5/2001
EP    1490679    12/2004
(Continued)

*Primary Examiner* — Jennifer Wecker
*Assistant Examiner* — Jonathan Bortoli
(74) *Attorney, Agent, or Firm* — James D. Petruzzi; The Petruzzi Law Firm

(57) ABSTRACT

An apparatus and method for isolating bacterial particles in a sample using a container with material in temporary fluid blocking position to lower orifice in the container, a separation medium having an electrical conductivity lower than and physical density greater than that of the sample above the material that supports a sample concentrate after passing through the separation medium when exposed to centrifugal force, a heating element for liquefying the material to permit flow into a chamber past an electrode array that attracts and holds subject particles. The system allows rapid detection and isolation of particles from samples from animal, human, environmental sites, a bio-industrial reactor or a food or beverage production facility requiring relatively small volumes, short incubation times resulting in structurally intact particles for further analysis. Testing may be completed in a single unit that requires decreased technician manipulation, fewer steps and a decrease in cross-contamination.

20 Claims, 7 Drawing Sheets

(51) Int. Cl.
*B03C 5/00* (2006.01)
*B03C 5/02* (2006.01)
*G01N 1/31* (2006.01)
*G01N 1/40* (2006.01)
*G01N 15/06* (2006.01)

(52) U.S. Cl.
CPC ............ *G01N 1/31* (2013.01); *G01N 1/4077* (2013.01); *G01N 15/0656* (2013.01); *B01L 2200/0652* (2013.01); *B01L 2200/0673* (2013.01); *B01L 2200/0689* (2013.01); *B01L 2300/042* (2013.01); *B01L 2300/0645* (2013.01); *B01L 2300/12* (2013.01); *B01L 2300/16* (2013.01); *B01L 2400/0409* (2013.01); *B01L 2400/0424* (2013.01); *B01L 2400/0677* (2013.01); *B03C 2201/26* (2013.01)

(58) Field of Classification Search
CPC ......... B01L 2300/0645; B01L 2300/12; B01L 2300/16; B01L 2400/0409; B01L 2400/0424; B01L 2400/0677; B01L 3/5021; B01L 3/502761; B01L 7/00; B03C 2201/26; B03C 5/005; B03C 5/026; G01N 1/31; G01N 1/4077; G01N 15/0656; G01N 15/1031; G01N 2001/4083; G01N 2015/0065
See application file for complete search history.

(56) References Cited

U.S. PATENT DOCUMENTS

| | | |
|---|---|---|
| 8,182,746 B2 | 5/2012 | Guzman |
| 8,431,340 B2 | 4/2013 | Jovanovich et al. |
| 8,519,358 B2 | 8/2013 | Ingber et al. |
| 8,647,574 B2 | 2/2014 | Halverson et al. |
| 8,685,746 B2 | 4/2014 | Halverson et al. |
| 8,709,344 B2 | 4/2014 | Bishop et al. |
| 8,911,667 B2 | 12/2014 | Beumer et al. |
| 9,052,255 B2 | 6/2015 | Langlois et al. |
| 9,709,516 B2 | 7/2017 | Berndt |
| 10,059,975 B2 | 8/2018 | Walsh et al. |
| 10,288,632 B2 | 5/2019 | Ingber et al. |
| 10,690,627 B2 | 6/2020 | Kindwall et al. |
| 2006/0073585 A1 | 4/2006 | McDevitt et al. |
| 2006/0102482 A1 | 5/2006 | Auerswald et al. |
| 2008/0299600 A1 | 12/2008 | Bommarito et al. |
| 2016/0310941 A1* | 10/2016 | Rajagopal ........... B01L 3/50215 |
| 2017/0350878 A1 | 12/2017 | Holmes et al. |

FOREIGN PATENT DOCUMENTS

| | | |
|---|---|---|
| WO | WO1999032882 | 7/1999 |
| WO | WO2005031300 | 4/2005 |
| WO | WO2013003309 | 1/2013 |
| WO | WO2015095145 | 6/2015 |

* cited by examiner

METHOD AND APPARATUS FOR ISOLATING AND DETECTING BIOLOGICAL AND OTHER PARTICLES

CROSS REFERENCE TO RELATED APPLICATION

This application claims the benefit of U.S. provisional application Ser. No. 62/622,391, entitled "Method and Apparatus for Isolating, Detecting, and Characterizing Biological Particles" filed on Jan. 26, 2018 which is hereby incorporated by reference as if fully set forth herein.

FIELD OF THE INVENTION

The present invention relates to a method and device for isolating and detecting biological and other particles generally and provides for the concentration of discrete biological particles (e.g. single cell organisms, single cells, microscopic multicellular organisms, fragments of cellular material, extracellular vesicles, subcellular organelles, viruses) and other particles, including biologically functionalized particles, such as micro-beads that are coated with a biological recognition element (eg., antibodies, oligonucleotide probes), detection of biological particle presence, a calculation of their abundance, analysis of particles present, and a provision for a means of transference of said particles into a separate vessel for further manipulation and analysis, specifically.

BACKGROUND OF THE INVENTION

Sample preparation is an essential step in the detection and analysis of biological particles that cause disease in humans and animals or disrupt natural ecosystems or contaminate food, drugs, pharmaceuticals, and beverages. In the most general sense, preparative processes aim to enrich material of interest or deplete material that is undesired or interferes with the analysis of material of interest such that any analytical processes applied to the sample yield more accurate information regarding the presence and characteristics of the biological particles of interest. For example, in many industrial or medical applications it is critical to detect and characterize microorganisms. To that end, many sample preparation technologies and methods have been developed to separate, concentrate, and/or isolate microorganisms present in the primary specimen or in samples derived from the specimen. One of the most prevalent among these methods are culture techniques, which generally provide nutrients needed for microorganisms to proliferate and may also include agents that inhibit the growth or activity of other cell types (e.g., immune cells) from disrupting the microbial proliferation process.

Many applications of these technologies and methods require processing times that are rapid, so that some action can be taken based on the interpretation of a test result. For example, the detection and characterization of pathogenic bacteria and fungi that have entered the bloodstream and are causing severe disease. Patients having compromised or deficient immune systems to fight disease-causing microorganisms (e.g. newborns, the elderly, organ or stem cell transplant recipient, patients with HIV/AIDS, patients on long term dialysis, and individuals undergoing cancer chemo- and radiotherapy) are especially prone to bloodstream infections (BSI). If the infection is not treated within the first few hours of clinical presentation with effective antimicrobial chemotherapy, then the patient's condition can quickly decline into more severe states each with an increasing risk of mortality. However, current laboratory procedures to detect and characterize microorganisms present in blood and other sterile fluids are plagued by turnaround times greater than 48 hours. Therefore, the prevalent strategy for managing sepsis in early stages of the disease relies heavily on empiric treatment. Patients suspected of having a BSI are started on a broad-spectrum antibiotic and a blood specimen is sent to the lab for analysis. The initial treatment is continued until the infection is confirmed and the etiological agent is characterized. Each step in the laboratory process allows pharmacists to adjust the empiric antimicrobial treatment. For example, narrow-spectrum drugs can be used instead of broad-spectrum based on lab results that rule out the presence of Gram-positive bacteria. This strategy is problematical because clinicians may prescribe an ineffective type of antibiotic or dosage initially, before lab test results are available, which wastes valuable time and contributes to the overall increasing prevalence of multiple drug-resistant microorganisms. Higher mortality rates in bacteremia are strongly associated with selecting an inappropriate antimicrobial therapy within the first 24 hours.

Historically, many attempts have been made to improve upon the collection and testing of biological particles—with advancements in several discrete areas to decrease the pendency time for diagnosis—each of which serves to merely approximate the many advantages enumerated by the present invention and method for use.

Earlier solutions described a method for detection of bacteria in blood by centrifugation and filtration by enriching target organisms by density-gradient centrifugation. The goal of the technique is to drive the motion of red blood cells into a denser liquid beneath the sample. This process also requires manual fluid transfer steps to transfer the supernatant from the tube to a filtration system. A preferred embodiment of the present invention does not rely on a physical membrane filter, largely because these filters are prone to "fouling" and clogging and it is difficult to recover target cells from the filter surface because target particles can adhere to the material and the target particles can be cultivated directly in the isolation chamber, or in an adjacent chamber, without the need for manual fluid transfer into another vessel thus decreasing the likelihood of contamination while making the overall process more ergonomic.

Other solutions sought to adapt microscale detection technologies to clinically relevant volumes of biofluids by advancing a technique that can bridge the immense difference in scale (volume to length scales by utilizing a method of bacteriologic concentration which (1) disrupts undesired particles, (2) concentrate desired particles (that resisted the disruption step) by centrifugation, then (3) recovers the target particles for downstream analysis. These methods fail to obviate the manual fluid transfer of the bacteria to an off-line detection platform thus requiring operator intervention and requiring sample manipulation and device reconfiguration nor do they use of density gradients or electrokinetic manipulation to further enrich particles of interest (a method relying solely on centrifugation to transport the particles into a narrow opening at the bottom of their device leading to excess debris collection during the separation process which is known to interfere with downstream analysis).

Also, a portion of the present inventors have relied upon certain techniques to isolate and concentrate bacteria from blood using dielectrophoresis in hopes of proving, through the use of chemical agents that selectively alter the dielectric properties of undesired particles, that desired particles can be enriched using the phenomenon of positive dielectrophoresis (L. D'Amico, N. J. Ajami, J. A. Adachi, P. R. C. Gascoyne, and J. F. Petrosino, "Isolation and concentration of bacteria from blood using microfluidic membraneless dialysis and dielectrophoresis," Lab Chip, 2017, 17, 1340). This earlier work describes a membraneless filtration system designed to reduce the ionic concentration of bacteria, which minimizes Joule heating and enables isolation of bacteria from permeabilized blood cells by positive dielectrophoresis. However, it was discovered that, the maximum volumetric flow rate that allowed for efficient pathogen isolation was about 0.5 mL/hr., where, in diagnostic microbiology and many other cell separation processes, processing time and scalability (the capability to process samples in parallel) are critical performance criteria for the detection and isolation. As opposed to the prior art, preferred embodiments of the present invention prove to bypass the need for membraneless dialysis by centrifuging the sample over a denser liquid. Ions do not migrate into the density-gradient medium over the duration of a typical process, which effectively achieves "dialysis" of the desired particles, which are sufficiently dense to penetrate the liquid-liquid interface between the original sample and the density gradient medium and, of greater importance, that the entire process of separating, concentrating, and detecting particles occur within a single device. The deficiencies, though, of the previously proposed methods via use of several compartments (each performing a different function) and, which is most critical, a significant tradeoff between the geometry of selected chambers and the performance of the system became apparent. More specifically, chambers had to be long, typically greater than 10 cm and perhaps 10s of mm wide while also remaining just a few tens of microns to achieve the required throughput demanded by many intended uses of the invention. Devices having such dimensions can be realized using current manufacturing practices, but are relatively difficult to operate, especially in a parallelized instrument allowing for "random-access" for specimens that are loaded and processed at different time points.

Other solutions fail in part because they use manual fluid extraction to estimate the separation efficiencies (the standard laboratory method in density gradient centrifugation) which is an aspect greatly improved upon in the present invention, (2) the method does not describe a way in which the separation method could be integrated with a built-in detection system, and (3) they use off-line analysis techniques to enumerate the particle levels.

Other solutions such as patent application to Salmon et al. US 2011/0123979 A1 a method for combining the use of dielectrophoresis, centrifugation, selective cell lysis, and a scanning laser optical system to collect and detect microorganisms in blood or blood products is shown but is limited in that the specimen must first be diluted before a sample is loaded into the device. This means that operators must perform off-line sample processing steps, introducing the risk of contaminating the specimen and adding to the hands-on time. The dilution step is required because the ionic concentration in blood is too high to allow for positive dielectrophoresis collection. This critical limitation is addressed in the present invention using the density gradient medium having sufficiently low ionic concentration that allows for positive dielectrophoresis of target biological particles that migrate into the denser fluid below the blood sample during the centrifugation step. Furthermore, Salmon et al. does not describe or provide for any means of recovering target biological particles once they are detected. In fact, those inventors described a special polycationic coating on the microelectrodes to promote stronger adhesion of target biological particles, so that they are strongly immobilized during the scanning laser detection process. Salmon et al. only allows for access to the target biological particles from the top of the well. Preferred embodiments of the present invention overcomes these limitations by providing an access port proximal to the detection chamber and opposite to the sample input port, so that i) the recovered cells are only minimally diluted when recovered and ii) interferents in the original specimen remain separated from the target biological particles during the recovery process.

Other patents including, Anderson et al. describe in U.S. Pat. No. 6,346,421 "Methods for Concentrating and Detecting Microorganisms in Centrifuge Tubes" require a tapered geometric configuration to create chambers of decreasing volume deeper in the centrifuge tube, such that particles that are denser will migrate from the original sample (positioned atop the denser fluids) into the smaller chambers and like Salmon et al., there is no straight-forward way for operators to access the concentration chambers containing target particles.

Similarly, Raj et al. disclosed "Systems and Methods for Detecting an Analyte of Interest in a Sample Using Filters and Microstructured Surfaces" (publication number WO2013003309A1) has a container comprising the filter portion coupled to a detection portion, and a detection portion comprising a microstructured surface. However, this fails to teach or suggest the use of a density medium that is layered atop a meltable semi-solid gel plug, which is critical for controlling the position of target biological particles, storing reagents, and maximizing the recovery efficiency of target particles present in the original specimen. Another disclosure to Raj et al. disclosed "Systems and Methods for Sample Concentration and Detection Using a Separation Liquid" (publication number WO2015095145A1) a device that consists of a sample detection container which is centrifuged towards the microcavity to form a sediment and a supernatant of the sample. This disclosure does not anticipate or suggest the use of a density medium that is layered atop a thermally-reversible gel plug, nor does this disclosure anticipate the incorporation of microfluidic or microelectronic components to achieve further manipulation of target biological particles using micro-electrokinetic and other physical phenomena within a self-contained apparatus as described herein with regard to the present invention. Preferred embodiments of the present invention discloses methods that allow for all necessary components, buffers, and reagents to be included within the device prior to initiating the analysis. This allows for the device to be a complete analysis system, making it unnecessary for cumbersome operator intervention.

Too, Walsh et al. disclosed "Methods for the Isolation and Identification of Microorganisms" (publication number WO2010062352A1). The method of the invention comprises an optional lysis step for lysing non-microorganism cells that may be present in a test sample, followed by a subsequent separation step using centrifugation with a density gradient medium. The method does not disclose a method for achieving higher enrichment factor for the target cells beyond that which can be achieved by centrifugation alone. This introduces a critical limitation in the method, because it does not anticipate or provide claims for a device or method that would allow for the detection and recovery of low abundance microorganisms, or any biological particle for that matter. The most challenging situation, which the present disclosure intends to address, is when particles are in low abundance in clinically or industrially relevant sample volumes. The methods described by Walsh et al. to recover the pellet are inappropriate when handling small numbers of particles, and would make it difficult to achieve higher concentrations by introducing a diluent to mechanically resuspend the pellet. The preferred embodiments of the present invention makes it unnecessary to perform these additional cumbersome steps by the method of forming a layer or film on the gel plug at the base of the density medium and by incorporating features in the device that allow for the film of target particles to be funneled into a microchamber where electrokinetic forces are used to further concentrate said particles.

Similarly, Kircher et al. disclosed in "Formulations and Process For Isolating Viable Microorganism from Positive Blood Cultures" (publication number WO 2013130759 A1) a series of different types of reagents that would selectively lyse mammalian blood cells but leave microbial cells relatively unaffected. In addition, the disclosure provides methods by which those reagents are used to separate and enrich target microbes from the blood by incubating the sample with the lysis buffer for an interval of time and then using centrifugation to form a pellet, and then resuspending the pellet with the said buffer or one of another composition (a well-known pellet and wash iterative procedure). As with the disclosed methods and reagents in WO2010062352A, the disclosure of Kircher does not anticipate the use of a gel plug beneath a density medium. In fact, Kircher et al. did not describe the use of a density medium at all, nor is there any discussion of incorporating fluidic channels in the device between the sample for the purposes of achieving higher concentration factors (more than 10,000×) in the level of target particles.

Also, "System For Conducting The Identification Of Bacteria In Biological Samples" (publication number WO2009100197A2), the device has a metal coating on the inner chamber but that metal layer is intended for use as a reflective coating to facilitate an optical analysis. The metal layer is not photopatterned using standard or any type of photolithographic processes to provide an array of geometric features, nor is the metal layer energized using an electric signal to generate electrokinetic forces.

Also, Suehiro and colleagues have described the use of electrochemical impedance spectroscopy systems for detecting microorganisms that are enhanced by enriching target particles using dielectrophoresis ("Selective detection of viable bacteria using dielectrophoretic impedance measurement method", *J. of Electrostatics,* 2003, 57, 2, and "Quantitative estimation of biological cell concentration suspended in aqueous medium by using dielectrophoretic impedance measurement method", *J. of Physics D, Applied Physics,* 1999, 32, 21). The embodiments described by this group feature a two-terminal sensor configuration, which would have a significant limitation because it is unable to use a range of frequencies below about 500 kHz due to masking effects created by the so-called electrode polarization, or the Warburg Impedance. In addition, by using the same microelectrodes for dielectrophoresis enrichment as for electrochemical impedance sensing these authors could not implement the four-terminal measurement strategy used in this present invention that allows for electrode polarization effects to be minimized during the sensing process. The four-terminal method is made possible in the present invention by creating microelectrode arrays that have four independently addressable electrical contact pads in such a way that the "path" of the applied electric field used for sensing the presence of target biological particles within the microchamber traverses the fluid volume over the microelectrode array that is used to generate the electrokinetic forces for enriching target biological particles. It is important to note that, like other embodiments of sensor systems using dielectrophoresis or other electrokinetic phenomena to enrich target particles, the inventions of Suehiro and colleagues do not provide for a method or apparatus that integrates the function of sample conditioning. The present invention represents a major improvement to this class of technologies in enabling simultaneous i) sample conditioning (the separation of target particles from ions and undesired particle types) and ii) a rapid pre-enrichment step to allow for rapid specimen processing.

Too, Weber et al. describe a method and apparatus in U.S. Pat. No. 9,120,105 B2 an "Electronic Device For Pathogen Detection". This invention describes a process where target biological particles are enriched from a sample using electrokinetic trapping at physiological ion levels. The device requires costly manufacturing practices and does not describe a way for conditioning the sample prior to processing in the unit, to either reduce the ion concentration or reducing the concentration of undesired cells. Preferred embodiments of the present invention circumvent this by using a planar configuration that does not require, but would allow for, multiple layers of channels. This is possible because target particles have been pre-concentrated such that the volumetric processing rate through the microchannel containing microelectrodes can be sufficiently low and the total specimen processing time can still be within a timeframe demanded by the application. Furthermore, the use of parallel channels may not be necessary because the concentration of ions would be sufficiently low (<200 mS/m) to allow for higher voltages (>10 V) to be applied to the microelectrodes without concern of increasing the temperature of the fluid beyond levels that are allowed for preserving viable and intact biological particles.

Finally, Cooper et al. reported "A Microdevice for Rapid Optical Detection of Magnetically Captured Rare Blood Pathogens" in Lab on a Chip in 2014, vol. 14, issue 1, wherein a method for using immunomagnetic manipulation to enrich target organisms and the use of an imaging apparatus for optical detection. While this method provided excellent limit of detection, the disclosed process and apparatus has the disadvantage of requiring costly bioengineered tags and the disadvantage of requiring a priori knowledge of the target particles so that the biological recognition element (namely engineered antibodies that are covalently attached to magnetic particles) can be designed and developed. A key advantage in the present invention is that the process by which particles are enriched is untargeted. By using the biophysical properties of biological particles of interest, the operator can remain hypothesis-independent and detect and characterize a very broad range of biological particles, thereby minimizing the risk of inaccurate test results.

Current Laboratory Methods for Detecting Microorganisms

Detecting the presence of microbes can take 12-120 hours for various reasons including: low concentrations (1-10/mL), early stages of infections, and/or because of slow growth. Once detected, microbes are isolated and quantified by sub-culturing the sample on solid agar. Isolated colonies are then tested to determine taxonomic identity and antimicrobial susceptibility.

A paradigm shift favoring the implementation of molecular detection products is occurring in microbial isolation and analysis. Molecular techniques, like PCR panels, offer superior sensitivity and faster turn-around-time compared with conventional culture methods. Despite these compelling advantages, molecular diagnostics have largely failed to supplant culture methods for confirming the presence of viable pathogenic microorganisms in fluids such as blood, and for distinguishing true pathogens from contaminants. An important limitation of current molecular strategies is that microbes must be destroyed, precluding the opportunity to confirm the presence of an intact and viable pathogen and preventing the isolation of pathogens from the primary specimen to determine their drug-susceptibility and minimum inhibitory concentrations. This tradeoff is unacceptable in managing sepsis. An effective solution must offer rapid and non-destructive detection and isolation in a single-testing unit so that pathogens undergo minimal manipulation and result in viable, intact microorganisms that can be cultured and profiled downstream to determine the appropriate therapy.

BRIEF SUMMARY OF THE INVENTION

There are a multitude of methods used to analyze mixtures of biological particles to isolate, detect, and recover a subpopulation of biological particles of interest from mixtures. For microorganisms, in vitro culture, wherein the specimen is mixed with agents (chemical, biochemical, or in some cases other biological cells) that promote or inhibit the biological growth of organisms in a vessel or device, has long been used in many fields. In bacteriology and mycology, in vitro culture remains the de facto "gold standard". The culturing process may be automated by incorporating a transducer, for example a pressure sensor within the culture vessel or a fluorescent dye, which provide an indirect indication of growth of the biological particles of interest. Similarly, technologies have been described that monitor volatile organic compounds emitted by metabolically active microorganisms. Alternatively, the growth of organisms can be directly observed by the naked eye or with the assistance of optical technologies. For example, it is possible to differentiate between bacterial, fungal, and viral meningitis using a so-called cyto-centrifuge to position bacteria onto a glass slide which is then examined microscopically. It has also been shown that microorganisms can be stained or labeled using bioengineered tags or biochemicals that can be detected using a flow cytometer or a fluorescent microscope.

Current in vitro culture technologies that use either direct or indirect detection mechanisms require long incubation periods, typically from 18-48 hours or more, so that the cells of interest have grown to sufficient concentrations for direct analysis. In some cases, the initial concentration of biological particles at the time of sampling can be sufficient to allow for more immediate detection using any of the said methods, from a few hours to perhaps eight hours. In the case of the cyto-centrifuge, there are instances where the concentration of the target biological particles is sufficiently high to allow for direct observation without any further processing steps or manipulation. However, in many applications the cyto-centrifuge is not useful due to the presence of background particulate matter (debris, or perhaps other cell types) that prevent or interfere with the direct observation of target biological particles. It has been suggested that magnetic microbeads with bioengineered antibodies conjugated to the surface could be used to separate and enrich biological particles from the original sample matrix prior to their detection via non-disruptive means. This might be accomplished by first incubating the magnetic beads with the sample for a short period so that the beads can attach to the target particle and then applying an external magnetic field to concentrate the bound particles. The problem with this approach is that the operator needs to design the antibodies against specific targets. In many applications, it is paramount that the method and apparatus remain hypothesis-independent so that a wide set of biological particles can be detected. By implementing a targeted assay, the positive result may suffice to guide appropriate intervention. However, a negative result does not exclude the possibility that organisms which were not targeted are present. In the context of bloodstream infections, the negative result does not provide a complete diagnosis, and leads to inappropriate antimicrobial therapy.

Many molecular assays, "lab-on-chip" devices, and point-of-care technologies have failed to supplant routine blood cultures for the detection and quantification of pathogens. The present design and process was meticulously crafted by in-depth field research together with expertise in the art and novel and inventive techniques that centered around the deficiencies encountered by technicians "in the field" and an imaginative approach to correcting these inadequacies. The present invention has the additional advantage not only because it uniquely blends cultivation methods and new sample preparation technologies to accelerate microbiology laboratory turn-around-time but also because it integrates long-felt needs in specimen processing for microorganism detection, differentiation and analysis into the existing workflow to create a system that is ergonomic, efficient and less prone to cross contamination.

The present invention pushes the limits of rapid and non-destructive detection of low-level microbes. Electrical impedance spectroscopy (EIS) is an established method for detecting microorganisms. Several instruments commercially available employ this technology: Bactometer™ (Biomerieux), RABIT™ (DW Scientific) Malthus™ (Malthus Instrument), BacTrac™ (SyLab). However, these commercial instruments lack concentration and isolation steps needed to achieve rapid detection of low-level microorganisms. The present invention harnesses macro- and microscale physics to exploit the biophysical properties of microbes to clean up the sample and concentrate them to boost sensitivity of the detector.

The present invention, additionally, overcomes key technological barriers to meet the clinical demand for rapid sample processing. Advances in microfluidics and microelectronics provide fundamentally new capabilities in microbiological analysis. However, the microfluidic literature is rife with technology designed to accommodate just a few droplets of a fluid specimen and cannot meet critical performance requirements. For example, data indicate a direct relationship between the volume of blood cultured and the ability to detect BSI [29]. Typically, 10-30 mL of blood is required for adults and 3 mL for pediatric patients. The "lab in a tube" concept makes it possible to integrate macroscale sample processing with microscale capabilities. Bridging this technology gap addresses limitations that hitherto thwarted the application of miniaturized "lab on chip" systems.

Concisely, preferred embodiments of the present invention have several distinct advantages over conventional indirect and direct in vitro detection methods. First, it makes it possible to concentrate target subpopulations of particles within the sample without the need for bioengineered targeting probes. In this way, it allows users to remain hypothesis-independent when beginning the analysis of the sample. Secondly, by integrating low volume physical chambers (from picoliters up to several hundred microliters) within a larger volume vessel, the device bridges a critical technological gap which hitherto has hindered the use of microscale physical phenomena in analyzing large volume specimens typically required in industrial, environmental, or clinical applications. The design and operation of the device allow for an operator to analyze large volumes demanded by these applications within a much shorter interval than can be realized using existing technologies. Importantly, the methods discussed here accomplish this accelerated processing time within a single, disposable device and without the needed for complicated manual steps and risk of sample contamination. Yet another advantage to the current device is its ability to seamlessly integrate into current laboratory workflow: Clinical labs are understaffed, overtasked, and technician turnover rates are high. Several compelling technologies require numerous manual fluid transfer and washing steps, making these solutions less likely to be adopted in clinical labs. Preferred embodiments of the present invention comprise an automated, self-contained (no manual fluid transfer steps) device, and require minimal training.

In accordance with a preferred embodiment of the invention, there is shown an apparatus for isolating subject bacterial particles in a sample having a container with a proximal closed end with sealed access port through which sample may be delivered into the container, a material disposed above the distal end of the container in temporary fluid blocking position to an orifice disposed at the distal end of the container, a separation medium disposed adjacent the material and extended over a cross sectional volume of the container on the proximal side of the material within the container, the material adapted to support a concentrate of the sample after passing through the separation medium when the container is exposed to a centrifugal force, a heating element for liquefying the material and removing it from the fluid blocking position for fluid flow through the container out the orifice, and a chamber having at least one activatable electrode array, the chamber disposed in fluid communication with the container through the orifice for flow of the concentrate in the presence of the activated electrode array for generating electrokinetic effects to retain subject particles within the chamber.

In accordance with a another preferred embodiment of the invention, there is shown a method for isolating particles in a sample, the method having the steps of providing a first elongated container having a port through a sealed proximal end for delivering a sample into the container having a separation medium disposed adjacent a meltable material, the meltable material positioned on the bottom and side surface of the distal end of the container above and an orifice at the distal end of the container, concentrating the particles by exposing it to centrifugal force to pass it through the separation medium and rest the concentrate on the meltable material, heating the meltable material and flushing it through the container out the orifice into a chamber in fluid communication with the container; and activating an electrode in the chamber for attracting and holding subject particles in the sample to the electrode.

In accordance with yet another embodiment of the invention, there is shown a system for isolating particles having a first container having a sealed access port at the proximal end through which sample may be delivered into the container through a hollow tube, a gel disposed above the distal end of the container in temporary fluid blocking position to an orifice disposed at the distal end of the container, a separation medium having lower electrical conductivity and higher physical density than the sample disposed adjacent the gel on the proximal side of the gel within the container through which the sample may pass, the gel adapted to receive a concentrate of the sample through the separation medium when the container is exposed to a centrifugal force, a heating element for melting the gel and removing it from the fluid blocking position for fluid flow through the container out the orifice, and a second container having a microchamber with at least one activatable electrode arrays downstream of the first container orifice, the microchamber chamber disposed in fluid communication with the container through the orifice for pressurized flow of the biological material in the presence of the first electrode array for a pre-determined period of time to attract and hold subject particles against or near the electrode followed by either fluid flow and/or centrifugal force past a second activated electrode array for attracting and holding subject particles at or near the electrode.

Other objects and advantages of the present invention will become apparent from the following descriptions, taken in connection with the accompanying drawings, wherein, by way of illustration and example, embodiments of the present invention are disclosed.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Figure 1:
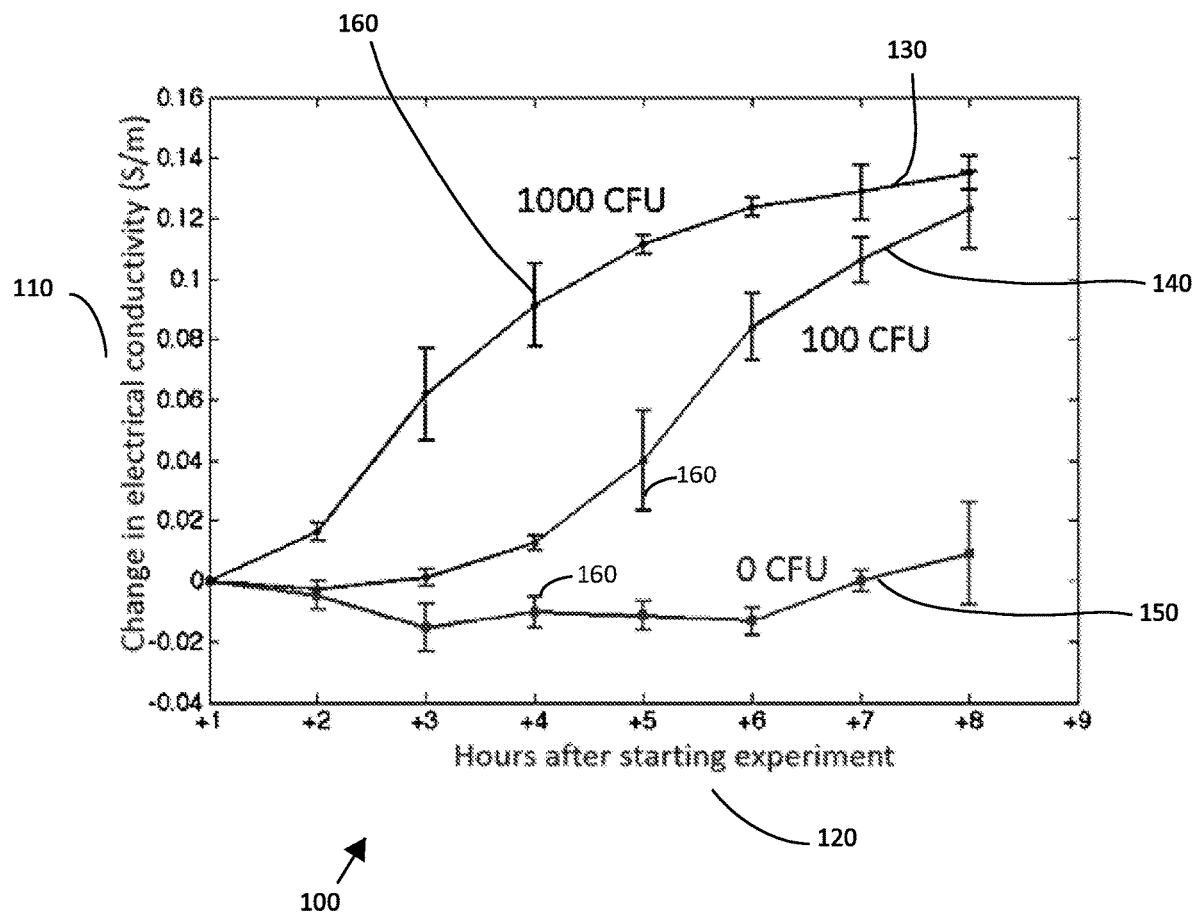
FIG. 1 shows a graph of conductivity versus time according to a preferred embodiment of the present invention.

Detailed descriptions of the preferred embodiment are provided herein. It is to be understood, however, that the present invention may be embodied in various forms. Therefore, specific details disclosed herein are not to be interpreted as limiting, but rather as a basis for later filed claims and as a representative basis for teaching one skilled in the art to employ the present invention in virtually any appropriately detailed system, structure or manner.

In Vitro Diagnostic Tool for Bacterial and Fungal Bloodstream Infections

A preferred embodiment of the present invention device is essentially a "lab-in-a-tube" about the size of a standard 1, 5, 15, or 50 mL conical tubes, depending on the needs of the application. In the application of processing blood specimens from adult patients (typically 10 mL), a technician would mount a standard blood collection tube on top of the present invention. Optionally, the blood collection tube may be one that contains lysis buffer that selectively disrupts host blood cells but leaves microorganisms relatively unaffected, in terms of their physical properties and physiological status. Blood is automatically drawn into the present invention chamber by negative pressure in the lab-in-a-tube device, or by creating a pressure gradient using a system external to the tube device, or by manually loading the sample into the device. Then following a brief centrifugation step, the technician places the present invention device into a custom benchtop instrument and is free to perform other lab tasks. Meanwhile, the centrifugation step is performed by the benchtop instrument, which may require only a few minutes or several hours, depending on the application. In the case of a detecting bacteria or fungi in a 10-mL blood specimen, the lab tube might be centrifuged between 10-45 minutes, depending on the rotor diameter, the angular velocity of the centrifuge motor, and the dimensions of the lab-in-tube device. Overall the present invention device and instrument i) use centrifugation, fluid-flow, and electrokinetic phenomena to non-destructively isolate microorganisms within a microfluidic chamber, and ii) use built-in microelectrode sensors and/or optically-clear walls to achieve rapid detection and accurate quantification of a broad range of microbes using a non-disruptive transduction method such as electrochemical impedance spectroscopy, electroenzymatic biosensing, calorimetry, and/or microscopy. An alarm is triggered (sound and electronic notification) once microorganisms are detected or the analysis is complete. The process will require less than 10 minutes of hands-on time and the tube is disposable. Once detected, microbes can be retrieved from the device for further analysis as further described with FIGS. 2 through 6 below.

Non-Destructive Isolation of a Broad Range of Biological Particles

Detecting low level biological particles quickly demands that target biological particles are first concentrated. Furthermore, many analytical techniques may require that biological particles of interest are first separated from the primary specimen to minimize interference from inhibiting substances. In the case of isolating microorganisms from blood, the present invention device and system achieves this by 1) selective lysis of all blood cells or undesired biological particles, 2) density-gradient centrifugation to separate and pre-concentrate biological particles of interest from the sample, and 3) further concentration of target biological particles using electrokinetic phenomena, such as dielectrophoresis (DEP) in a microfluidic chip integrated at the base of the centrifuge tube. DEP is the motion of electrically polarized particles due to a non-uniform electrical field. Any intact biological cell will experience DEP, which allows the present invention to isolate all bacteria and fungi without a priori knowledge of the target. In this way, the device provides unbiased isolation of biological particles. Other effects, such as electrohydrodynamic phenomena, may also influence the trajectory of biological particles. Diffusion may be an important force governing the motion of biological particles in the present invention, depending on the so-called Stoke's diameter of the particle and the temperature of the system. In the case of other sample types, such as urine, the lysis of host cells may be unnecessary at a first step in the process. In some embodiments, the density gradient separation medium may prevent the transport of undesired particles or substances into the lower layers of the chamber, effectively removing them from further analyses. The characteristics of the electrical signals that give rise to electrokinetic phenomena within the present invention may too enable the separation of target biological particles from undesired particles and substances.

Electrical Polarization in Biological Matter

Electrical polarization and conduction processes occur in biological systems and are important in understanding the electrokinetic behavior of cells. Various mobile charge carriers that can contribute to electrical conduction and polarization in biological systems, including ions, protons and other small molecules. It can be appreciated that the structural, composition, and conformation attributes may all contribute to the electrical properties of biological particles. Biological cells are assemblies of interacting biological systems encapsulated within a membrane structure that separates the internal processes of life from the environment. Some cells also have internal organelles and compartments with distinct compositions and structural features. The size, shape and composition of biological particles and cells vary immensely, giving rise to tremendous diversity in the physical and electrical properties of cells. In general, cells can be approximated as spheres having a diameter on the order of one to ten micrometers. The cell cytosol of bacteria, archaea, algae, viruses, parasites, and fungi are all encapsulated by barriers that are more complex than the plasma membrane of mammalian cells and that are composed of different types of interwoven biopolymers. Algae typically possess external cell walls made of glycoproteins and polysaccharides which are similar in composition to the plant cell wall like cellulose, alginate and agarose. Diatoms have a cell wall composed of biogenic silica. Fungi are differentiated from plant cells by the fact that their cell walls contain the unbranched chains of the glucosamine polymer chitin that are cross-linked by various sugar molecules. The other major constituent of the fungal wall are glycosylated proteins with branching mannose sugars. Bacteria have a cell wall that contains a structure called the peptidoglycan, also known as the polysaccharide-peptidoglycan wall. Gram-negatives possess a second outer phospholipid bilayer which envelops a thin peptidoglycan mesh. There are also bacteria that lack cell walls. Some prokaryotes produce an extracellular, hydro-gelatinous polymer called the glycocalyx. Most archaea possess an outer proteinaceous layer called the surface-layer (S-layer). Most S-layers are 5-25 nm thick. It follows that these regions of fixed charge contribute to the electrical response of these interwoven structural biopolymers. The diversity produced by nature confers unique and intrinsic properties upon the structural variants of prokaryotes, potentiating opportunities for isolating and sorting different subpopulations contained within microbiomes by exploiting polarization and conductance phenomena.

Each phase or layer contributes to the overall electrical properties of the biological particle or cell. These different material properties cause charges to move with differing ease and/or at different rates following the application of an excitation field. For example, the phospholipid bilayer represents a barrier to mobile charges and can lead to the accumulations of charge at a membrane interface in the presence of an applied electric field. This interfacial polarization arises from dissimilar permittivity and/or conductivity values on either side of the interface. For spherical particles like biological cells, the accumulation of charge at the interface between the dissimilar conductive, dielectric materials results in an induced dipole. The time constant for such a particle may be written, $$\tau = \frac{\varepsilon_p + 2\varepsilon_m}{\sigma_p + 2\sigma_m}$$

where subscripts "p" and "m" refer to the particle and suspending medium, respectively. In aqueous media a shell of counter ions attracted from the bulk medium by coulombic forces to the ionized groups also influence other ions that are proximal to the surface of the particle. The balance electrostatic attraction and thermal dispersion produces an effective macroscopic charge density $\rho_{DL}$ in the diffuse double layer of counterions. For a binary electrolyte with a volume density of ions $n_0$ having equal valency z, a convenient measure of the extent of the electric double layer may be written as $$\lambda_{DL} = \left(\frac{\varepsilon_m k_B T}{2z^2 q^2 n_0}\right)^{\frac{1}{2}},$$

corresponding to the distance between the Stern plane of the particle and where the electrostatic potential has decreased by 63.2 percent. Physically, the electric double layer is an ionic atmosphere distributed around the particle in its suspending electrolyte. In the case of bacteria, an expression for the dielectric increment $\Delta\varepsilon$ due to the counter ion concentration within the porous region of the cell wall $N_+$ may be written, $$\Delta\varepsilon = \frac{q^2 a \delta_0}{\varepsilon_0 k_B T}$$

Here, $\delta_0$ is the counter ion concentration per unit area. In the case where the counter ion density within the porous region is far greater than the bulk suspending medium ion concentration ($N_+ \gg n_0$), the surface counter ion density may be calculated from, $$\delta_0 \approx \frac{1}{2q}(N_+ \varepsilon_w k_B T)^{\frac{1}{2}} \ln\left(\frac{|N_+|k_B T}{\varepsilon_w}\right)$$

where $\varepsilon_w$ is the electrical permittivity of the porous region. An expression for the effective particle conductivity that incorporates this tangential current pathway about a spherical surface may be written, $$\sigma_p = \sigma_\perp + \frac{2\sigma_{tan}}{a}$$

where again a is the particle diameter. The first term is the charge flux perpendicular to the particle surface and $\sigma_{tan}$ is the charge that moves along the surface in response to the tangential field. The characteristic response time of surface charge polarization may be written, $$\tau_{surf} = \frac{a^2}{2D_{eff}}\frac{1}{M}.$$

to account for the contributions of fluxes of both mobile charge and perturbed bound charge, the term M can be found from $$M = 1 + z_+ z_-(z_+ + z_-) n_b a/n_0 \lambda_{DL}$$

where $z_+$ and $z_-$ are the electrovalencies of positive and negative charge carriers and $n_b$ the total density of counter ions at equilibrium. The time response of charge carriers in the surface layers of the Stern model incorporates the particle size and an effective diffusivity of surface counter charges, $$D_{eff} = u_s k_B T/q$$

$$u_s = u_0 e^{-U_C/k_B T},$$

where $u_0$ represents the mobility of ions in the bulk. The fixed charges on the particle surface are assumed to create a set of periodically spaced, overlapping coulombic wells separated by potential energy barriers. The mean charging time $\bar{\tau}_{surf}$ is, $$\tau_{surf} = \frac{qa^2}{2u_0 k_B T} e^{U_C/k_B T}$$

$$\bar{\tau}_{surf} = \tau_{surf}[e^{-\Delta U_C/k_B T}]^{-\frac{1}{2}}$$

These distinct and time-dependent polarization phenomena are important when the system is energized by a time-varying electrical field, $$E = E_0 \cos \omega t + jE_0 \sin \omega t = E_0 e^{j\omega t}$$

where $E_0$ is the maximum amplitude of the harmonic wave and $j = \sqrt{-1}$, and the electric excitation field switches polarity slowly compared to the response rate of ions, then the polarization will be able to respond completely to the field changes and reach a maximum value in accordance with the field strength and direction. Conversely, if the applied field varies while charges are still in motion, there will be insufficient time for the polarization to reach its equilibrium state. As a result, the induced conduction and polarization will not be in phase with the applied field. Nomadic and molecular dipolar polarizations occur over short time scale whereas interfacial polarization and surface effects in particles require longer charging times. When time-varying electric fields are applied it is useful to define the complex conductivity $\tilde{\sigma} = \sigma + j\omega\varepsilon$ and the complex permittivity as $$\tilde{\varepsilon} = \varepsilon - \frac{\sigma}{j\omega}.$$

The complex permittivity and conductivity parameters reflect the fact that the bioelectric response to electrical excitation in cells is not instantaneous.

To account for the different layers of biological particles and the different polarization phenomena, it is common to mathematically model cells using the so-called multi-shell model. Through this approach, a multilayered particle can be transformed into an equivalent dielectric model. For example, a two-layer particle with corresponding complex permittivities $\tilde{\varepsilon}_1$ and $\tilde{\varepsilon}_2$ will have an effective complex permittivity given by, $$\tilde{\varepsilon}_p = \tilde{\varepsilon}_2 \left[ \frac{\gamma^3 + 2(\tilde{\varepsilon}_1 - \tilde{\varepsilon}_2)}{\gamma^3 - (\tilde{\varepsilon}_1 + 2\tilde{\varepsilon}_2)} \right]$$

where $\gamma = a_2/a_1$. Bacteria have been modeled in terms of two and three concentric shell models, respectively, including a shunt admittance element representing counter ions in the porous wall moving parallel to the surface. The effective complex permittivity of a Gram-positive bacterium may be written $$\tilde{\varepsilon}_{G+} = \tilde{\varepsilon}_{core} + \tilde{\varepsilon}_{wall}$$

This equation is equivalent to a model for shunt admittance with the inclusion of a conducting shell enclosing an electrically homogeneous inner core which, for example, may represent the effective electrical properties of the cell membrane and cytosol. This term is derived by solving the electrostatic potential outside a sphere but with a variant form of the boundary condition for charge continuity, $$j\omega[\tilde{\varepsilon}_m \tilde{E}_m - \tilde{\varepsilon}_p \tilde{E}_p] + \nabla_s \tilde{G}_s$$

where $\nabla_s$ is the surface del operator, or divergence of the complex surface conductance $\tilde{G}_s$ induced by the tangential component of the applied electric field. For Gram-negative bacteria an additional shell is included to account for the outer plasma membrane according to the admittance model, $$\tilde{\varepsilon}_{G-} = \tilde{\varepsilon}_{om} \frac{\gamma_2^3 + 2\left(\frac{\chi_1 - \tilde{\varepsilon}_{om}}{\chi_1 + 2\tilde{\varepsilon}_{om}}\right)}{\gamma_2^3 - \left(\frac{\chi_1 - \tilde{\varepsilon}_{om}}{\chi_1 + 2\tilde{\varepsilon}_{om}}\right)}$$

with $\chi_1 = \tilde{\varepsilon}_{core} + \tilde{\varepsilon}_{wall}$.

For concentric heterogeneous, layered systems like biological cells this iterative process proves to be a very useful model for predicting the electrical response of different cell types under different conditions. The effective permittivity and conductivity of the particle can be easily calculated by taking the real and imaginary parts of the effective complex permittivity, $$\varepsilon_p = \frac{\text{Re}[\tilde{\varepsilon}_p]}{\varepsilon_0}$$

and $\sigma_p = \text{Im}[-\omega \cdot \tilde{\varepsilon}_p]$

When time-varying external fields are used, the finite charging time associated with the various conduction and polarization phenomena is important in determining how significantly each process contributes to the overall electrical responses of biological cells. It has been demonstrated that cells exhibit four different regimes of dielectric dispersions the frequency range between 10 Hz-100 MHz associated with the various compartments and barriers defining the cellular structure. For example, in the case of bacteria, at low frequencies the electrical properties are dominated by the relatively high conductivity of the cell wall with the electrical properties of the cell interior being entirely screened from low frequency imposed electric fields by the insulating inner plasma membrane. The electrical responses of many bacteria exhibit two response regimes as the frequency of the applied field is increased from 1 kHz to around 100 kHz. The first response is interpreted as the ionic conduction at the cell wall, the other by dipolar and ionic losses occurring at the cell membrane. In the 100 kHz to 1 MHz frequency range, the well-known Maxwell-Wagner polarization effect dominates the polarization response. As the frequency is increased still further above 1 MHz the electric field penetrates the cell and internal structures and properties therefore govern the bioelectrical responses of cells in this higher frequency range.

For a spherical biological cell, the polarization field can be treated as being equivalent to the field emanating from a single induced effective dipole moment. For a conducting dielectric particle, it is well known that the complex dipole moment of the particle is therefore given by, $$\tilde{p}_{eff} 4\pi\varepsilon_m \tilde{K}_{CM} a^3 E_0$$

where a is the particle radius, $\varepsilon_m$ is the relative permittivity (not complex) and, $$\tilde{K}_{CM} = \left( \frac{\tilde{\varepsilon}_p - \tilde{\varepsilon}_m}{\tilde{\varepsilon}_p + 2\tilde{\varepsilon}_m} \right)$$

The complex number $\tilde{K}_{CM}$, which is typically referred to as the Clausius-Mosotti factor, contains the dynamic electrical response of the particle. If the particle is far less polarizable than the suspending fluid $\tilde{\varepsilon}_p \ll \tilde{\varepsilon}_m$ and the induced dipole is antiparallel to the applied field and the particle is driven away from the high field region, a process referred to as negative dielectrophoresis. When the particle is more electrically polarizable than the medium $\tilde{\varepsilon}_p \gg \tilde{\varepsilon}_m$ the particle moves towards the high field region, a phenomenon called positive dielectrophoresis (DEP). The dielectrophoretic force arises from the interaction of a non-uniform electric field and the asymmetrically distributed space charges at the particle boundary. If the electric field is non-uniform in space the particle experiences a translational force. The magnitude and direction depend on the electrical properties of the particle and surrounding medium, and on the magnitude and frequency of the harmonic electric field. The time-averaged dielectrophoretic force for a dipole in the time-varying electric field $E(\omega)$ is given by, $$F = (\tilde{p}_{eff} \cdot \nabla) E$$

For a spherical particle this expression becomes, $$\langle F_{DEP} \rangle = \frac{1}{2} \text{Re}[(p \cdot \nabla) E^*] =$$

$$\frac{1}{4} V \varepsilon_m \text{Re}[\tilde{K}_{CM}] \nabla |E|^2 - \frac{1}{2} V \varepsilon_m \text{Im}[\tilde{K}_{CM}] (\nabla \times (\text{Re}[E] \times \text{Im}[E]))$$

where V is the particle volume, E is the RMS electric field strength, and $\nabla$ is the vector gradient operator; the symbol * indicates complex conjugation; Re and Im are the real and imaginary operators; the polarizability of the cell is $\tilde{K}_{CM}$ and $|E|^2 = E \cdot E^*$. It follows that the DEP force is determined by the divergent field created by the geometric configuration of the electrodes. The term $\nabla |E|^2$ underscores the importance for using microelectrodes for DEP manipulation of biological cells because the DEP forces scales with the square of the system characteristic length. Various electrode geometries can be used to maximize the spatial inhomogeneity of the electric field. A common pattern is the castellated geometry and its variants. A staggered variant of the castellated geometry may also be employed to further enhance the field inhomogeneity.

The simplest microelectrode array used in DEP microsystems is the co-planar, parallel bar pattern. This creates homogeneous fields in the plane of the microelectrodes but strongly inhomogeneous fringing fields above the plane of the electrode array. The highest electric field region is located at the electrode edges. In the castellated pattern a local low field occurs in the pockets between adjacent electrode tips. Similarly, a local field minimum may be found at the midpoint between parallel bars. In all cases, the magnitude of the electric field strength and inhomogeneity decreases rapidly with distance above the energized surface.

To effectively harness DEP forces there is a need to physically confine particles close to the surface. It is for this reason that virtually all DEP devices incorporate microfluidics with channel feature sizes on the order of 1-100 μm. Microelectrodes embedded on one or more wall of microfluidic channels enable the use of DEP for working with small particles like cells. Internal fluid flow is governed by the well-known Navier-Stoke's equation describing the mechanical force balance that may be written, $$\rho_m \left( \underbrace{\frac{\partial v}{\partial t}}_{\text{Inertia}} + \underbrace{(v \cdot \nabla)v}_{\text{Convective acceleration}} \right) = \underbrace{-\nabla p}_{\text{Pressure gradient}} + \underbrace{\nabla \cdot (\eta \nabla v)}_{\text{Viscosity}} \underbrace{}_{\text{Divergence of stress}} + \underbrace{f}_{\text{Body forces}}$$

In the absence of body forces (f=0) the fully developed $$\left( \frac{\partial v}{\partial t} = 0 \right)$$

flow velocity between semi-infinite, parallel walls separated a distance H may be written, $$v(h) = \frac{H^2}{2\eta} \left( \frac{\partial p}{\partial x} \right) \left[ \left( \frac{h}{H} \right)^2 - \frac{h}{H} \right]$$

where $$\frac{\partial p}{\partial x}$$

is the rate of change or pressure along the length of the channel and h is the height above the bottom wall. It is useful to represent this fluid flow velocity field in terms of the average velocity $\bar{v}$, $$v(h) = 6\bar{v} \frac{h}{H} \left( 1 - \frac{h}{H} \right)$$

This mathematical form allows one to calculate the velocity distribution for parameters that may be changed during device fabrication or controlled during operations, such as the width of the channel W and the volumetric flow rate Q. This is possible using the relationship $$\bar{v} = \frac{Q}{WH}.$$

Considering the governing equations of fluid flow within microfluidic devices and DEP reveals important limitations to microfluidic-based DEP systems. Most DEP microsystems are designed to handle very small volumes, usually on the order of 0.01 mL. Slow processing speed is a major roadblock to DEP applications in clinical and industrial applications. Typical DEP devices are operated at ~30 μL/min, which equates to a processing time of about 12.5 days for a single 10 mL specimen of blood. The reason for this slow processing rate is readily apparent when the estimated time required for collecting bacteria by DEP is compared to the average time microbes spend within the microfluidic chamber. The residence time of the cell suspension is determined by the geometry of the duct and the specimen processing rate. The DEP velocity may be written, $$u_{DEP} = \frac{F_{DEP}}{\gamma} = \frac{a^2 \varepsilon_m}{6\eta} \operatorname{Re}[\tilde{K}_{CM}(\omega)] \nabla |E|^2,$$

It follows that the trapping efficiency of electrokinetic microdevices can be improved by increasing the magnitude of the electric field. However, Joule heating can raise the temperature of the system and adversely affect the physiology of particles such as cells and proteins. The membrane structures of most biological cells become permeabilized around ~45° C. within ~30 seconds. From an engineering design perspective, it is useful to estimate the temperature changes within DEP microdevices to understand the operational limitations. The electrical, mechanical, and energy equations are coupled and related to the spatial-temporal temperature distribution within the suspending fluid $T_f$ by, $$\underbrace{\rho_f c_{f,p} \frac{\partial T_f}{\partial t}}_{\text{Energy storage}} = \underbrace{\rho_f c_{f,p} u \frac{\partial T_f}{\partial x}}_{\text{Internal advection}} + \underbrace{k_f \frac{\partial^2 T_f}{\partial z^2}}_{\text{Heat diffusion}} + \underbrace{\sigma_f E^2}_{\text{Electric heat generation}}$$

$c_{f,p}$ is the specific heat of the fluid at constant pressure, u is the fluid velocity, $\rho_f$ is the density of the suspending medium, $\mu_f$ is the dynamic viscosity of the fluid, $\dot{\gamma}$ is the fluid shear rate, E is the time-averaged magnitude of the applied electric field, and $\sigma_f$ is the electrical conductivity of the suspending medium. Endothermic and exothermic reactions are assumed to not significantly impact the energy balance within the device during cell separations. Under most conditions, advection is negligible compared to conduction. The fluid layer thermal time constant is computed by $\tau_f = (H/Ak_f)(\rho_f V c_{f,p}) \sim 10$ milliseconds, and the fluid is therefore assumed to be at steady-state. Heat generated in the fluid layer is dissipated into the chamber walls, which are assumed to also have no phase change, nor any internal heat generation or consumption reactions. The energy balance for this material may be written, $$\underbrace{\rho_f c_{b,p} \frac{\partial T_b}{\partial t}}_{\text{Energy storage}} = \underbrace{\frac{\partial}{\partial z} \cdot \left( k_b \frac{\partial T_b}{\partial z} \right)}_{\text{Heat diffusion}}$$

where $T_b$ is the temperature at the board (or substrate layer). Convective and radiative heat transport are excluded from the analysis because the microfluidic device may be placed in thermal contact with a heat sink made of a material such as a metal. The thermal time constant of the chamber walls depends on the choice of material and thickness of the board layer. Glass, molded silicones like polydimethylsiloxane (PDMS), and thermoplastics like polymethylmethacrylate (PMMA) are common selections for microfluidic devices. In the worst case, where thick (~1 mm) and poor thermally conducting materials ($k_b \approx 0.15$ W·m$^{-1}$·K$^{-1}$) are chosen, the thermal time constant of the board layer would be $\tau_b \sim 100$ sec, shorter than the duration of most separation processes, which typically require about 30 minutes for milliliter scale specimens. Therefore, this material is assumed to be at thermal equilibrium. Proceeding with these assumptions and approximations, the energy balance for the fluid and board layers comprising a typical continuous-mode micro-electrokinetic separation device is, $$\text{Fluid: } \frac{\partial^2 T_f}{\partial z^2} = -\frac{\sigma_f E^2}{k_f}$$

$$\text{Board layer: } 0 = \frac{\partial^2 T_b}{\partial z^2}$$

It is further assumed that heat generation is uniform within the microfluidic layer. Embedded electrodes do not contribute significantly to heat transfer or thermal energy storage because they are very thin relative to the other layers and conduct heat much faster. Within typical operating temperature ranges, the thermal conductivity values of the fluid and board layers do not vary significantly. However, the electrical conductivity of the electrolyte may significantly vary during operation. To find the maximum fluid temperature at steady-state such that cells are not damaged during operation, it is common to approximate the electrical conductivity temperature-dependence as being linear, with $\sigma_f(T) = \sigma_{f,0}[1 + \alpha(T_f - T_{f,0})]$, where $\sigma_{f,0}$ is the electrical conductivity at some reference temperature $T_{f,0}$ and $\alpha \approx 0.02$ K$^{-1}$. The mathematical analysis is further simplified by taking advantage of symmetry about the mid-plane within the fluid layer. Applying the Neumann boundary condition at the mid-plane (z=0) and letting $T_f(z=H/2)=T_i$, the solution to the fluid energy balance may approximated as, $$T_f = \frac{\sigma_0 V^2 (1 + \alpha \Delta T)}{2 k_f} \left( \frac{1}{4} - \frac{z^2}{H^2} \right) + T_i \text{ for } 0 \le z \le \frac{H}{2}$$

with $\Delta T = (T_{f,max} - T_{f,0})$. The maximum fluid temperature can be calculated from, $$T_f(z=0) = T_{f,max} = \frac{\sigma_0 V^2 (1 + \alpha \Delta T)}{8 k_f} + T_i$$

Solving for the maximum fluid temperature therefore reduces to working out the equivalent thermal circuit for half the composite assembly, with constant heat flux per unit area $q'_{ET} = \dot{Q}_{ET} H$ and thermal resistance per unit area R'. The temperature at the electrolyte/board interface is $T_i = T_\infty + q'_{ET} R'$, and the expression for estimating the maximum temperature change, after arranging terms, may be written as, $$\Delta T \approx \frac{\beta}{8 k_f H - \alpha \beta}$$

Where $\beta = \sigma_0 V^2 (H + 8 k_f R')$. This final expression is useful because it directly relates the maximum fluid temperature change to engineering design and operational parameters, including the geometry of the microfluidic assembly, the properties of the construction materials, the magnitude of the applied voltage, and the temperature-dependent electrical conductivity of the fluid.

How the Present Invention Detects a Broad Range of Microorganisms

The present invention uses electrochemical impedance spectroscopy (EIS) to measure changes in the electrical properties of the fluid caused by microbial metabolism and proliferation. In general, microorganisms consume non-ionic compounds (e.g. carbohydrates) to power metabolism. They produce ionic species (hydrogen ions, ammonium, lactate, etc.) that are expelled into the surrounding medium and increase its conductivity. This rate of change in the conductivity will increase as the microorganisms proliferate and become greater in numbers. By placing microelectrodes in culture medium, the gradual rise in conductivity can be measure over time [27], [28].

We adapted this method for rapid detection by embedding two microelectrodes in a 0.5 µL (0.05 mm height×2.5 mm length×5 mm width) microfluidic incubator built by inventors. It was possible to detect the presence of 100 colony forming units (CFU) after 5 hours of incubation.

The present invention uses this proven detection method and uses automated optical microscopy to provide quantitative and clinically actionable results. In this way, any metabolically active microbes will be detected and enumerated in the chamber.

Turning to FIG. 1, there is shown a graph 100 of the change of electrical conductivity in siemens per meter or S/m on the y-axis 110 versus time in hours after starting the experiment on the x-axis 120. Three different 130, 140 and 150 are shown for Colony Forming Units of bacteria of 1000, 100 and 0 CFU respectively. Testing results were averaged at each hour with ranges 160 shown for example on each curve. As demonstrated on graph 100, microfluidic EIS detection of *E. coli* with increasing conductivity over time for higher concentrations was experienced, where curves for conductivity values were averaged over five separate runs. Note: Time-to-detection depends on the initial concentration.

Figure 2:
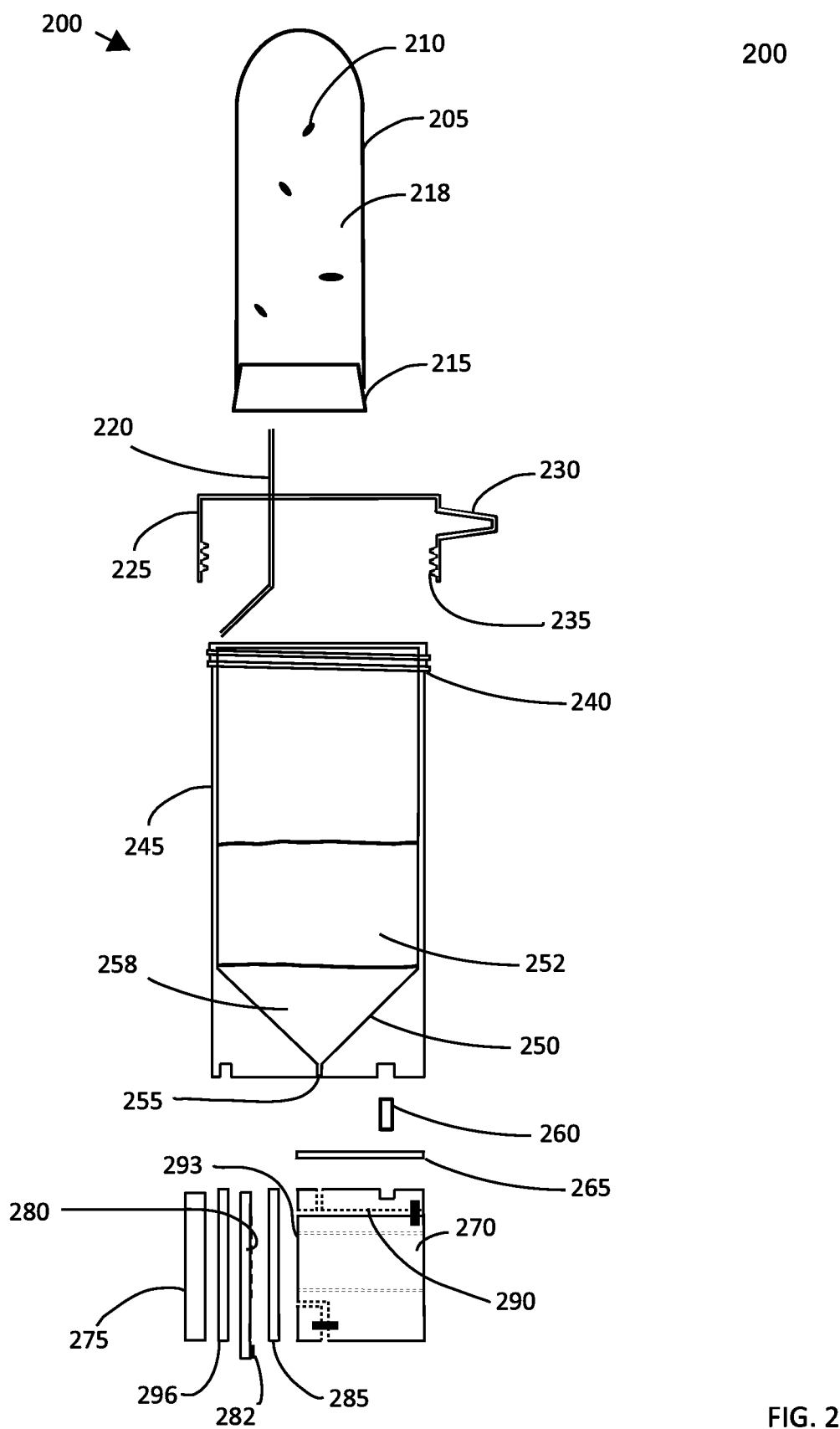
FIG. 2 shows an exploded schematic of a testing apparatus according to a preferred embodiment of the present invention.

Turning now to FIG. 2, there is shown an exploded schematic of a testing device 200 according to a preferred embodiment of the invention. A blood sample is taken in a conventional manner from a patient typically in a standard collection tube of 1, 5, 10, 15 or 50 mL and mounted on needle 220 for transference of the sample into container 245. Alternatively, the blood collection tube may contain lysis buffer that disrupts host blood cells but leaves subject particles unaffected for processing according to the present invention. Lid 225 has an opening through which needle 220 is pre-affixed to permit fluid flow from tube 205 into container 245 through stopper 215 that is punctured upon placement of tube 205 onto needle 220. Flow may be accomplished by negative pressure, such as from a vacuum in container 245 or external pressure through port 230 which is operatively attached to lid 225 and may be affixed to container 245 with mating threads 235 and 240.

Figure 5:
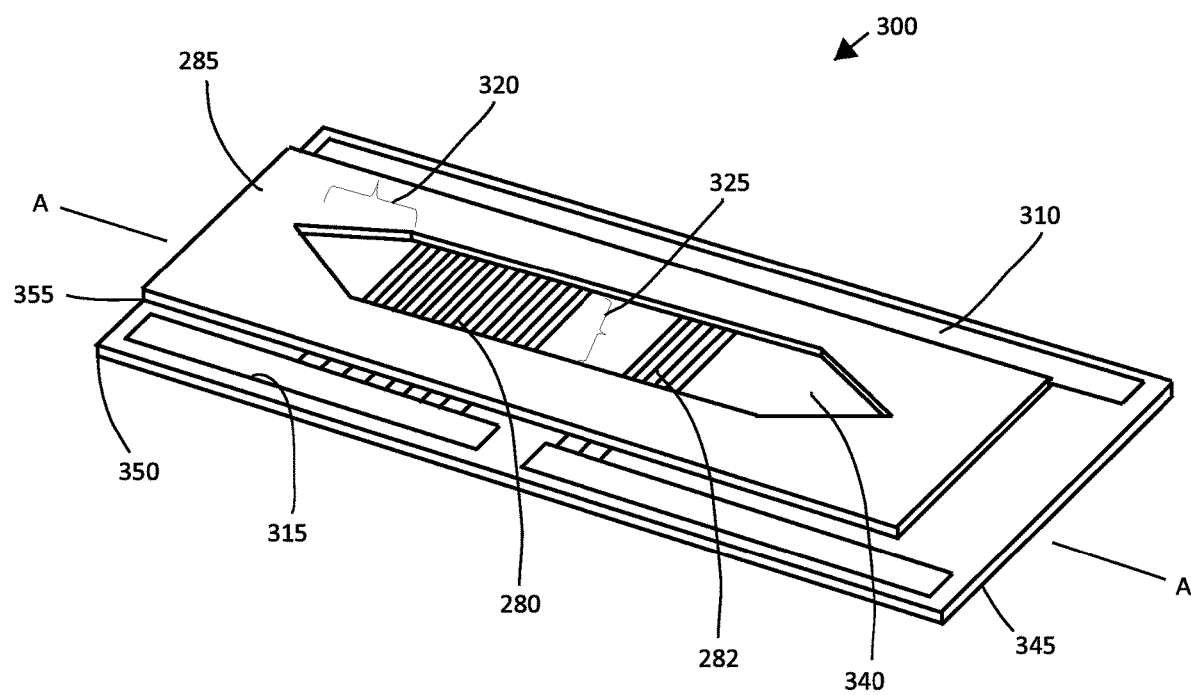
FIG. 5 shows a perspective view of a microchamber assembly and electrode arrangement for a testing apparatus according to a preferred embodiment of the present invention.

As more fully described below, container 245 has low electrical conductivity medium 252 across the entire section of container 245 and extended downward and positioned above meltable medium 258 in fluid blocking position at the bottom of container 245 blocking orifice 255. As a separate module or assembled in one piece along with container 245, microchamber 270 is positioned in fluid communication with orifice 255 for fluid flow of subject particles as further described below. Microchamber 270 is composed of channel 290 that allows fluid flow past electrode array 280 in a void created by the sandwiching of heat sink 275 to thermally-conductive adhesive layer 296 to electrode array 282 and adhesive strip 285 having laser etched opening 340 as shown in FIG. 5. Thermally conductive adhesive layer 296 may also be a thermally conductive paste.

Figure 3A:
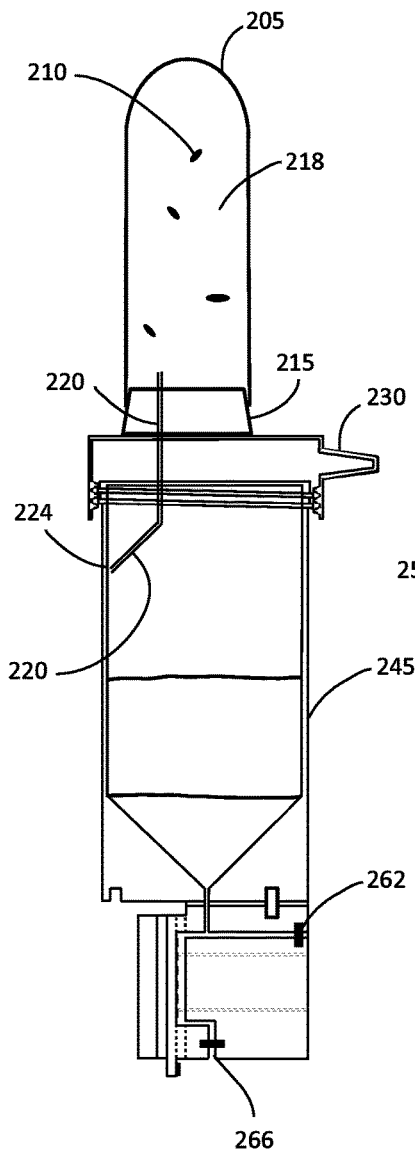
FIGS. 3A, 3B and 3C show a side schematic view of a testing apparatus in successive steps of operation according to a preferred embodiment of the present invention.
Figure 3B:
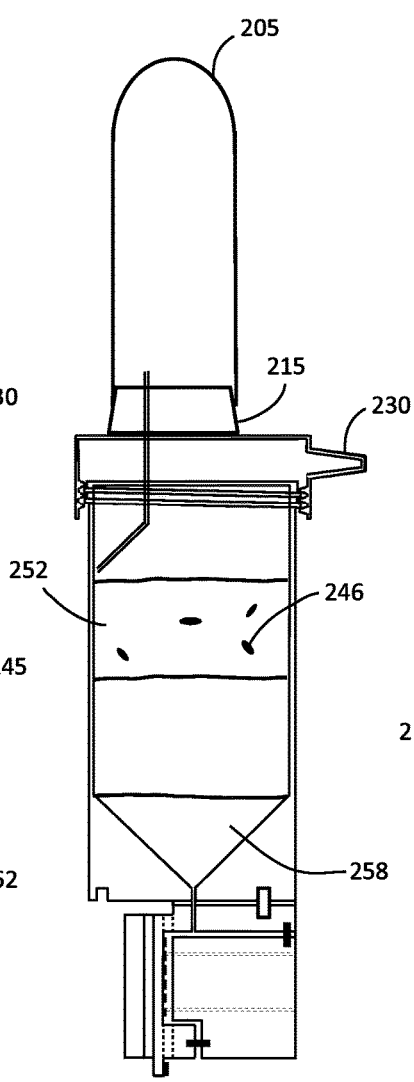
Figure 3C:
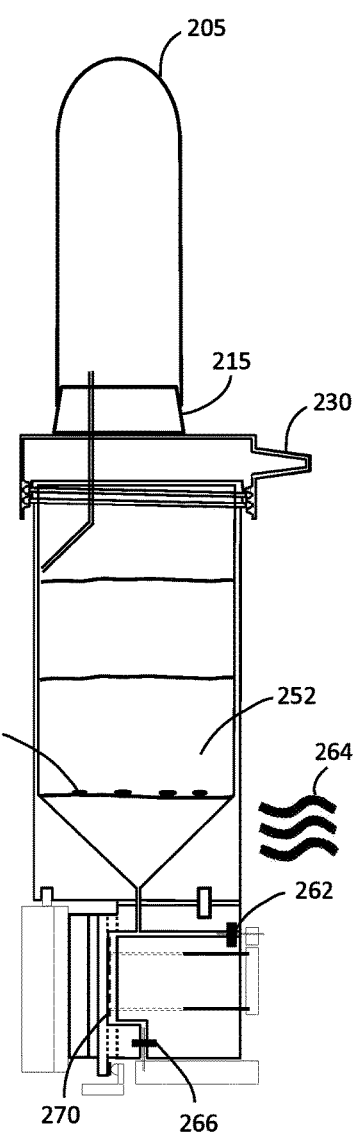

Turning to FIGS. 3A, 3B, and 3C there is shown a side schematic view of the cartridge and electrode chamber according to a preferred embodiment of the present invention operation (side view of the device) in stages of operation.

FIG. 3A shows a fully mounted container 245 with sample tube 205 and subject particles 210 within sample fluid 218. Upon fixing tube 205 onto needle 220 the sample fluid flows through needle 220 into container 245. In a preferred embodiment, needle 220 is angled so that its output is gently streamed against an inside wall of container 245 so that the sample and its subject particles initially fall onto low ionic separation medium 252 for later centrifugation. FIG. 3B shows subject particles 246 in low ionic medium 252 that is above impermeable but meltable medium 258. At this stage container 245 is spun in a conventional centrifuge that causes the subject particles 246 to be collected on top of meltable material 258 in a more concentrated form. FIG. 3C shows container 245 and microchamber 270 mounted to a base that permits action by heat 264 upon meltable material 258.

Stage 1 Sample Transfer: In a preferred embodiment, a technician simply mounts a standard Wampole blood collection tube, here shown as tube 205, on the top of the device. Blood is automatically drawn through a needle 220 toward the wall of the device tube so that the blood is layered over an isotonic iodixanol-mannitol density medium (~1070 kg/m3) 252 without mixing. The density of the iodixanol-mannitol mixture can be changed according to the needs of the application.

Stage 2 Separate Microbes from Sample: Efficient electrokinetic manipulation of biological particles requires that the ion levels in the suspending fluid be reduced below levels typically observed in biological fluids or environmental samples. This is because the electrical conductivity of the suspending medium can i) reduce the magnitude of the applied electric field because of an impedance mismatch between the suspending fluid and the signal generating electronics; ii) so-called Joule heating can adversely impact the physiology of many biological cells; iii) DEP trapping is less effective at higher conductivities because many biological particles will experience negative dielectrophoresis and be repelled away from microelectrodes and into faster moving fluid flow streams. The physical densities of bacteria and yeast are greater than the density medium, so centrifuging the device causes them to accelerate into the density medium that contains minimal ion levels and onto a 10% (w/v) gelatin plug. Other gel materials may be included in the present invention, depending on the application. The operational conditions required to separate target biological particles into the density medium layer depend upon the sedimentation coefficient of the particle $$s = \frac{v_t}{a},$$

where $v_t$ is the terminal sedimentation velocity and a is the applied acceleration, typically due to the centrifugal acceleration where $a=\omega^2 R$ with R being the distance of the object from the axis of rotation and $\omega$ the angular velocity of the object. The biological particle reaches terminal velocity when the applied centrifugal force balances the opposing force of viscous drag exerted on the particle by the suspending medium, so the terminal velocity for a spherical particle may be written mathematically $$v_t = \frac{m_b \omega^2 R}{6\pi \eta r}$$

with $m_b$ being the buoyant mass of the particle, $\eta$ the viscosity of the suspending medium, and r the radius of the spherical particle. These equations can be used to guide the design and operation of the centrifuge system. Because the density medium and the sample do not mix, ions remain in the sample and only slowly diffuse into the density medium. In this way, target biological particles that are denser than both the fluid in the original specimen and denser than the density gradient medium will be separated from the original specimen and travel toward the bottom of the density gradient medium 258 when inertial forces are applied. In the present invention, there may be a gelatin plug which provides a semi-soft landing pad for target particles.

Alternatively, the plug may be made of any of a variety of impermeable meltable materials and may be a coating on the bottom of the device tube that covers the lower orifice. In some embodiments, it may be feasible to have a permanent coating and use a valve in the lower orifice before flushing the concentrated microbes into the microchamber. The meltable material may be turned into a flowing material by any of a number of approaches that apply heat 264 to the meltable material 258 so it, and the subject particles may flow out of orifice 255. Meltable material 258 may be formed of a gelatin plug. Heating may be accomplished by placement of the entire apparatus in an incubator, not shown, or by use of heating elements external to container 245 for application of sufficient heat.

In other embodiments, the meltable material and/or the separation medium may also contain reagents necessary for biochemical reactions to occur with target particles, including but not limited to: biochemical dyes and stains: aptamers; functionalized micro- and nanoparticles; bioengineered tags like antibodies conjugated to enzymes; fluorophores or phosphors; oligonucleotide probes; or stimuli-responsive vesicles. The meltable material and separation medium may also contain chemical agents that alter the dielectric properties of biological particles, including but not limited to antimicrobial agents; ionophores; enzymes; detergents; chaotropes; kosmotropes; stimuli-responsive vesicles that containing any of the above agents (including agents needed for biochemical reactions) or ionic species; and other substances that are known to alter the electrical properties of biological materials.

Stage 3 Concentrate Microbes: Once microbes are positioned on gelatin plug 258, the testing apparatus is mounted in a control instrument. A needle punctures a septum blocking orifice 255 to draw fluid into microchamber 270, electrical contact is made with the device, and a tube connects the device to the control instruments pneumatics. The device is brought up to at least 32 Degrees Celsius to make a gelatin plug liquid. The target temperature may vary, depending on the composition of the plug. The instrument pressurizes the present invention to pump the biological particle concentrate into the detection microchamber, where they are temporarily immobilized by the phenomenon of ac DEP or dielectrophoresis.

In other embodiments the phenomenon of dc-biased DEP may be employed to temporarily immobilize biological particles of interest. In the case where the biological particle concentrate contains mixtures of different types of particles, the frequency of the applied ac field, the polarity of the dc-bias, and the magnitude of the dc-bias and the ac signal all operational variables that can be tuned to preferentially immobilize a fraction of biological particles while the remaining fraction of particles continue to flow through the channel and/or are repelled from the electrode elements. It is further possible to change the characteristics of the electrical signals in subsequent and individually addressable electrode arrays to immobilize biological particles that are contained in the fraction that is repelled from the first array. It is understood that any number of individually addressable arrays may be configured for the purposes of differentially manipulating with particles present in the concentrate.

Figures 4A, 4B, 4C:
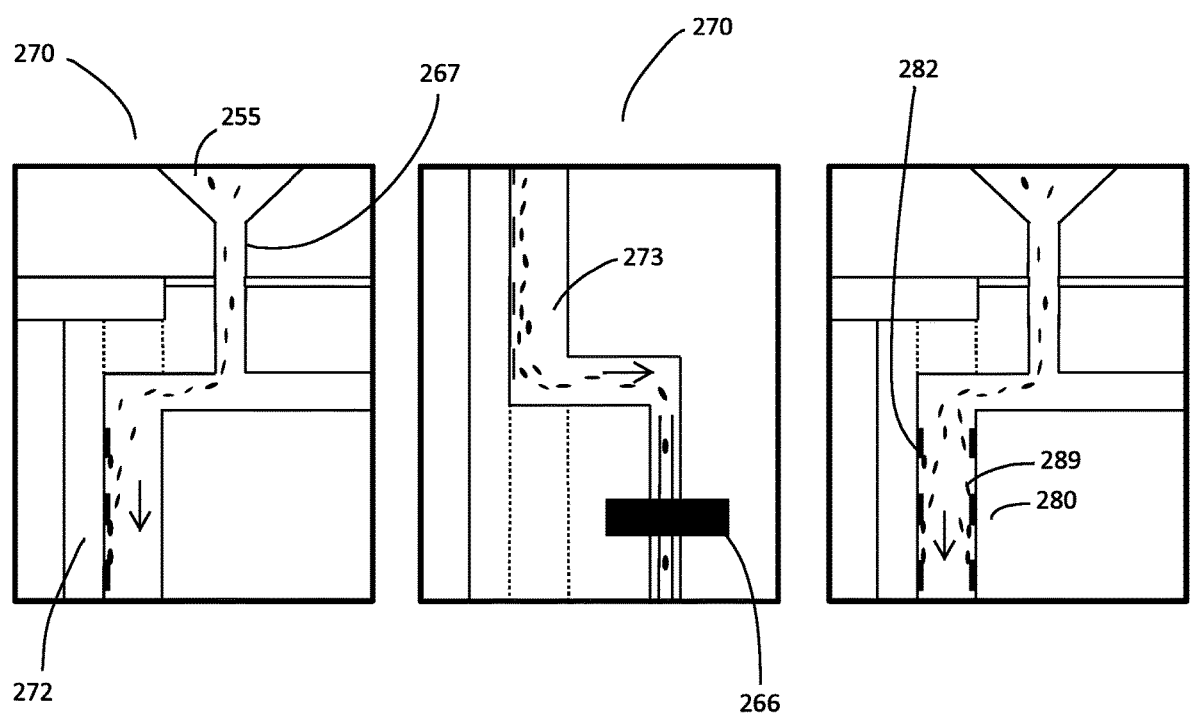
FIGS. 4A and 4B show a side view schematic of a microchamber for fluid flow of a testing apparatus according to a preferred embodiment of the present invention.
FIG. 4C shows an alternative side view schematic of a microchamber for fluid flow of a testing apparatus according to a preferred embodiment of the present invention.

Stage Four Detect Biological Particles: FIG. 4A shows fluid flow from orifice 255 down tube 267 in the direction of the electrode array 272 which is activated. The fluid flow is shut off and the microbes are incubated in microchamber 270, which may have a volume of just a few picoliters to as much as a few hundred microliters, depending on the application. In the case of microorganisms, the detection time depends on the i) the volume of the detection chamber, ii) the metabolic and growth rates of the organisms, iii) the initial concentration of target biological particles, and iv) the performance of the signal processing electronics connected to the device. The addition of reagents in either the separation medium of the meltable plug may accelerate the detection of target particles, too. Reagents may expedite the conductivity change by enabling a biochemical reaction between the target biological particles and said reagents to either change the electrical conductivity of the surrounding medium in the presence of and in proportion to the target particles, or by changing the optical properties of the suspending medium or the reagents or of the target particles. Signal acquisition and processing may be conducted in a multitude of ways using analog and/or digital circuitry.

The lab-in-tube device that is positioned within an incubator is connected to signal acquisition and processing circuitry using at least four electrical connectors that are adequately grounded from interfering electromagnetic signals, perhaps using a combination of coaxial cables, ground planes built into multilayered circuit boards, and/or the device is within a Faraday Cage. The EIS method involves the application of an excitation electrical signal of known magnitude $E_0$ (usually only a few hundred millivolts to achieve so-called pseudo-linearity) and frequency $\omega$, which can be expressed as a function of time: $E(t)=E_0\sin(\omega t)$ and measuring the current flowing through the system, said to be the response current. The response current will have a different magnitude $I(t)$ and phase $\phi$ than those of the applied signal, and can also be written as a function of time: $I(t)=I_0\sin(\omega t+\phi)$. The impedance is calculated using Ohm's law:

$$Z = \frac{E(t)}{I(t)} = \frac{E_0 \sin(\omega t)}{I_0 \sin(\omega t + \phi)}.$$

The electronic hardware is programmed to execute this measurement over a range of frequency values at desired points in time to obtain the impedance spectra. In the present invention, the frequency range that can be monitored is expanded to lower frequencies (<300 kHz) using a so-called tetrapolar or four-terminal impedance setup, and in some embodiments coating the electrodes within the detection chamber with so-called blackened platinum or polypyrrole to increase the surface area of the electrodes. In the present invention, many electrode configurations and geometries may be used depending on the application of the technology. For instance, the electrode size, thickness, and materials may be varied for different uses of the invention. The number of electrodes included in the four-terminal configuration might change in that one or more of the four terminals may branch within the invention to create a microelectrode array having electrodes elements that are castellated, staggered (symmetrically or asymmetrically), sawtooth, parallel bar, or three-dimensional shapes like cylinders or pyramids or bumps, as is needed for the application of the device. Once the EIS signal reaches a threshold, determined by comparing the time evolving impedance spectra to a baseline value and/or to impedance spectra contained in computer memory, the alarm is set off notifying operators that biological cells are present within the device. The technician may then mount the present device on a custom microscope (not shown) to enumerate microbes using video processing software or by manually counting particles in the field of view.

Stage Five Recover Microbes: Isolated microbes can be eluted from the device for downstream analysis. FIG. 4B show microchamber 270 with outlet tube flushing out subject particles past septum 266 in a first and second state of fluid flow past a single array of electrodes.

FIG. 4C shows an alternative microchamber 270 having electrode arrays 280 and 282 on both sides of the collection segment of flow path 289.

FIG. 5 shows a perspective view of sandwiched fluid chamber 300 and two arrays of electrodes 280 and 335. In a preferred embodiment of the invention, two separate collection arrays are positioned in the fluid path for selective collection of subject particles as each set of electrodes are successively activated. Sandwiched fluid chamber 300 is formed by at least two layers. Adhesive strip 285 has void 340 laser etched to create an opening that faces a portion of the flow path in microchamber 270. Adhesive strip 285 may be dual sided adhesive and is stuck to the microchamber face 293 shown in FIG. 2 and electrode mount 345 that has embedded within it first array of electrodes 280, second array of electrodes 282, contact bus 315 and common ground 310. This arrangement permits subject particles to flow past first array of electrodes 280 and be held for a pre-determined period of time, and then past second array of electrodes 282 and held for a pre-determined period of time.

Particles may be held against an array or held in the microchamber near or at an array.

The dimensions of the void may be of any shape, depth, and volume so long as sufficient area is presented for the fluid flow to accomplish the desired purpose. In a preferred embodiment, adhesive strip 285 may have a width 355 in the range of 25 microns to approximately 500 microns and electrode mount 345 may have a width 350 between 25 microns and 3 mm, depending on the construction materials. In another preferred embodiment the smaller range of values may be used to facilitate heat dissipation. In a preferred embodiment, etched width 325 of opening 340 is in the range of 1-30 mm, and length of upper triangle 320 of opening 340 is approximately 1.5 times the value of etched width 325. This facilitates a more even flow through the channel. Other dimensions may be used and the shape of triangle 320 may also be altered to a variety of shapes including a half circle, half oval, rectangle, square, or arched mitre configuration. Similarly, the opening 340 formed by the etched portion of wafer 305 may have other edge features so long as the sandwiched wafer when affixed to the chamber face forms a flow channel for the concentrate.

Figure 6A:
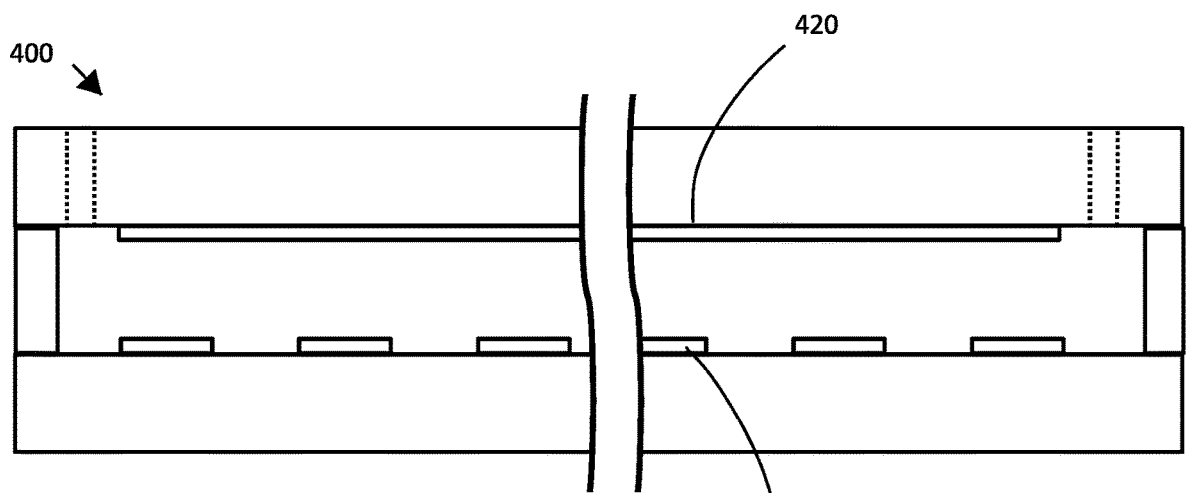
FIGS. 6A, 6B, and 6C show cross sectional views of a microchamber assembly with alternative electrode arrangements according to preferred embodiments of the present invention.
Figure 6B:
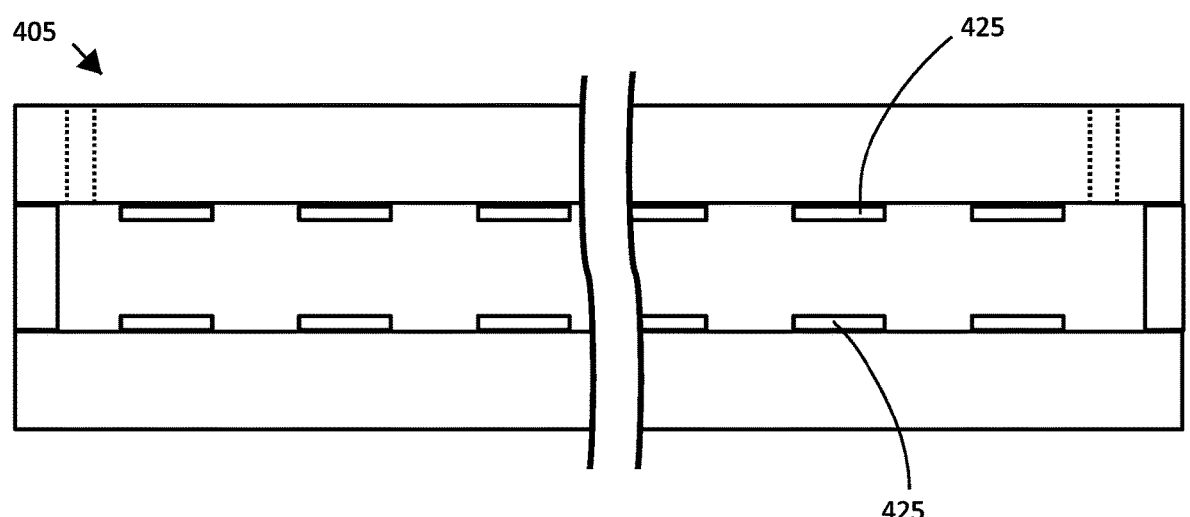
Figure 6C:
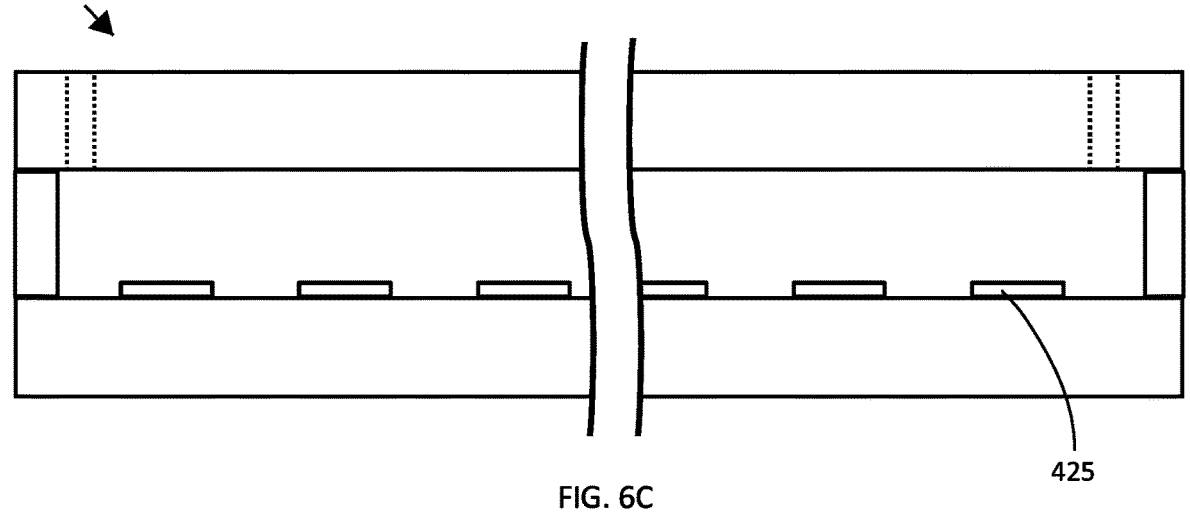

FIGS. 6A, 6B and 6C shows three different arrangements of electrodes in the preferred embodiments of the invention. FIG. 6A shows a cross sectional split view of sandwiched fluid chamber 300 along A-A of FIG. 5 with electrode array 400 having electrodes 425 on one side and ground 420 on the other side. FIG. 6B shows a cross sectional split view of sandwiched fluid chamber 300 with electrode array 405 having electrodes 425 on both sides. FIG. 6C shows a cross sectional split view of sandwiched fluid chamber 300 with electrode array 415 having electrodes 425 on one side and only. These configurations show how they might be used for electrokinetic isolation and electrochemical impedance spectroscopic analysis of the detection chamber within the lab-in-tube device.

Figure 7:
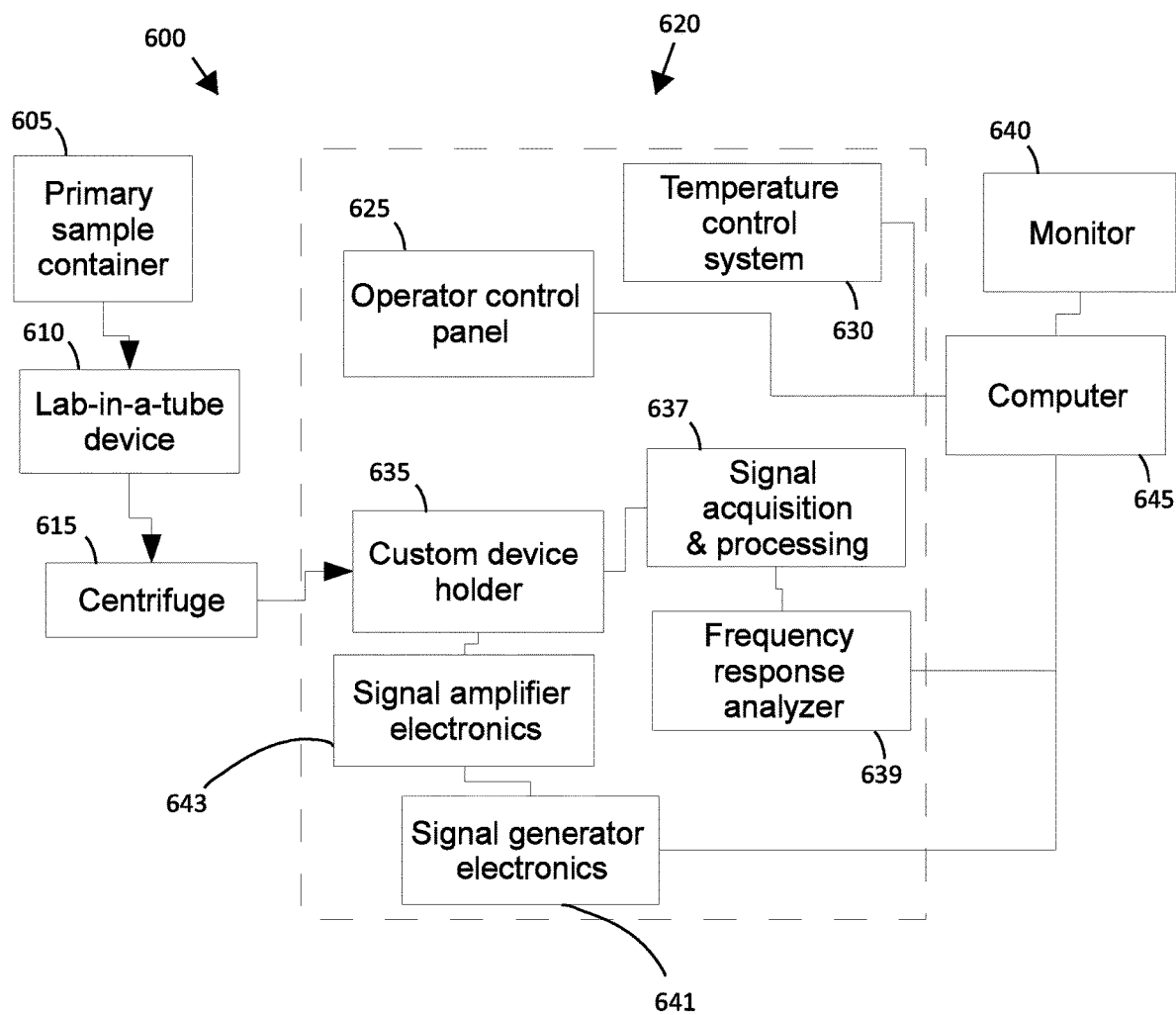
FIG. 7 shows a block diagram of the method and system for detecting and analyzing bacterial samples according to a preferred embodiment of the present invention.

Depicted diagrammatically in FIG. 7 is a block diagram and flow chart of a preferred embodiment of the present invention for apparatus setup that includes other external instrumentation helpful in conducting tests and analysis. System 600 has a first step 605 using primary sample container that is in turn flowed within lab in a tube device 610 using the apparatus heretofore described with centrifuge 615. This lab in a tube device 610 interfaces with the system 600 via custom device holder 635, and is controlled by controller 620 having an operator control panel 625, a temperature control system 630 both operated by computer 645 and visually shown on monitor 640. Computer 645 may acquire information from lab in a tube device 610 once it is in electrical and fluidic contact with customer device holder 635 via signal acquisition and processing 637 and frequency response analyzer 639. Further, computer 645 controls signal generator electronics 641 to produce the electrical waveforms that are transmitted to signal amplifier electronics 643 to produce a new signal of sufficient electrical power as is required by various applications of the invention. Signals transmitted from the signal amplifier electronics 643 to customer device holder 635 give rise to electrokinetic phenomena within lab in a tube device 610. In this way, the testing apparatus of the present invention may be fully automated and controlled using computer systems for sequencing the various steps of operation already described herein.

Examples of results using a system according to a preferred embodiment of the invention are discussed below.

EXAMPLE 1

Firstly, the use of a density gradient medium as a barrier to the ions in the original sample was tested and shown to work successfully. Briefly, a substance called OptiPrep is created, which is about 60% iodixanol, was diluted with 5% D-mannitol to create a solution having a physical density of 1080 kg/m3. About 500 microliters of this density gradient medium (OptiPrep) is placed in a 2 mL centrifuge tube. Then, about 500 microliters of whole blood, previously treated with saponin (final concentration of saponin was ~5 mg/mL), is spiked with bacteria (*Enteroccocus faecalis*) and is carefully layered on top of the density gradient medium using a pipettor equipped with a wide-bore pipette tip, so as to not disturb the heavier bottom fluid layer and cause mixing of the sample and that layer. The tube containing the sample and the separation density medium is then centrifuged at 8,000 RPM for 15 minutes using a standard bench top centrifuge having a rotor diameter of about 20 cm. If the target biological particles were smaller than bacteria, such as virus particles, the angular velocity and centrifugation interval would need to be increased to perhaps 20,000 RPM and several hours, depending on the sample volume and dimensions of the tube.

Following this procedure, the tube is removed from the centrifuge, the top fluid layer is carefully extracted manually using a pipettor equipped with a wide-bore pipette tip. A small volume of the density gradient nearest to the interface is additionally withdrawn. The remaining fluid is vortexed to resuspend any particulates, including bacteria and debris, that had become immobilized at the bottom of the vessel during the centrifugation process. The remaining fluid is then withdrawn, and a small sample is placed on a microscope slide or in a microfluidic well for further examination or processing. In either case, the slide or the device is mounted on a microscope stage so that the bacteria and other debris could be observed. The microfluidic well is typically made by gluing a rubber O-ring to a glass substrate having photopatterned, co-planar, and interdigitated metal microelectrode array on the top surface. Within the microfluidic well it is possible to manipulate bacteria recovered from the centrifuge tube using positive and negative dielectrophoresis by applying a time-varying electrical signal to the microelectrode array. Interestingly, some debris are observed in the suspension as well. However, those quasi-transparent objects do not seem to respond to the applied electric field. The signal is produced using a bench-top electronic signal generator, and the signal is monitored using an oscilloscope.

EXAMPLE 2

In another set of experiments, one mL of blood is placed above one mL of the density gradient medium. In this separate experiment, a larger volume allows for the electrical conductivity of the density gradient medium to be measured off-line using a flow-through probe and a bench-top conductivity meter. In three separate experiments, the highest conductivity value measured was 62.5 mS/m, which is about 24× lower than the electrical conductivity of whole blood (~1.5 S/m). The density gradient not only presents the migration of some biological particles to the bottom of the device while still allowing sufficiently dense particles to be transported through the density medium, it also provides a barrier to the diffusion of ions from the sample into lower fluid layers.

EXAMPLE 3

In yet another set of experiments, a small hole was bored in the bottom of the centrifuge tube and a rubber septum having dimensions of 11 mm in diameter and about 3 mm in thickness was positioned at the bottom of the centrifuge tube. This allowed the operator to access the bottom layer without disturbing the sample and the fluid interface between the density gradient medium and the sample when extracting a sub-sample from the density gradient medium. To test this device, *E. coli* was grown overnight in lysogeny broth, and 100 microliters of the culture was harvested and layered on top of a density gradient medium. The gradient medium was made by mixing Optiprep and a mannitol solution to adjust the density to approximately 1080 kg/m$^3$. After centrifuging the tube at 10,000 RPM for 10 minutes, the sample liquid appeared clarified, and a pellet formed along the surface of the septum. A needle was used to puncture the septum the plunger was withdrawn and depressed repeatedly to resuspend cells near the surface of the septum. On the final withdrawal, the needle was removed, and the liquid expelled onto a glass slide for examination. Bacteria could be detected using a microscope.

EXAMPLE 4

In other experiments, the invention was tested utilizing the combined use of dielectrophoresis to concentrate and position *Escherichia coli* particles before monitoring their metabolic activity and growth using electrochemical impedance spectroscopy. In these experiments, a microfluidic chamber was created by laser cutting the pattern of the desired fluid path into a double-sided pressure-activated adhesive sheet 0.002" thick. A plastic top was then bonded to a glass substrate that had co-planar, photopatterned, and interdigitated microelectrodes on its surface using said laser cut adhesive. The width of this microfluidic channel was about 3 mm. Several different test suspensions containing varying concentrations of bacteria suspended in a low electrical conductivity medium (about 15 mS/m NaCl and 5% mannitol) were injected into the device and the target particles were first concentrated on a small section of microelectrodes about 5 mm in length and 5 mm in width (spanning the entire width of the channel) using positive dielectrophoresis. Then, the bacteria were flushed from that segment by injecting the culture medium Lysogeny Broth into the chamber. The high conductivity of the Broth (>1 S/m) caused bacteria to be released from the microelectrodes by negative dielectrophoresis, and they were transported by the fluid flow into a separate chamber of about one microliter in volume and having embedded in the bottom wall two microelectrode bars that spanned the width of the microfluidic chamber. These two microelectrodes were connected to a bench-top frequency-response analyzer, which measured the in-phase and out-of-phase electrical impedance of the device every 20 minutes for a 12-hour period. The electrical impedance of the fluid containing the bacteria could be deduced using an equivalent circuit model, which was developed by measuring the parasitic impedance of individual components (the coaxial cables that connected the microfluidic device to the frequency-response analyzer, the metal contact pads on the device itself) and finally the impedance of the microchamber having the two microelectrodes embedded within. The magnitude and phase of the electrical impedance of this system could be displayed on a personal computer monitor that was connected to and controlling the frequency-response analyzer. Using this experimental setup, it was possible to show that the rate of change of the electrical impedance of the suspending fluid within the device was dependent upon the initial concentration of *E. coli*. Furthermore, it was confirmed that the signal did not appreciably change over time when no bacteria were present in the initial sample.

EXAMPLE 5

A $\frac{1}{32}$" hole was drilled at the base of a 50 mL conical centrifuge tube and covered using several sort pieces of tape. A 10% w/v gelatin solution was brought to 40 degrees Celsius in a hot water bath and 3 mL was transferred to the conical tube using a pipette and allowed to cool to room temperature, until the liquid solidified. Then 10 mL of a mixture of Optiprep and 5% mannitol having a physical density of 1080 kg/m3 was layered over the gelatin plug. A 1 mL sample of urine was spiked with 10 microliters of *E. coli* (optical density at 600 nm of 0.5), and that mixture was gently pipetted with the tip of the pipette placed at the side wall of the conical tube to not disturb the interface between the sample and the density gradient medium. The conical tube was capped and the tube was centrifuged in a swinging-bucket rotor (Rotor radius=10 cm) at 5000 RPM for 20 minutes. The tube was then transferred to a stationary incubator set to 37 degrees Celsius for about 10 minutes, until the gelatin melted. Then the tape was removed, and the cap was slightly unscrewed to create a pressure differential from the proximal and distal ends of the tube. Fluid droplets collected into three different 2 mL vessels and flow was stopped by screwing the cap back on the tube tightly. Bacteria could be detected in second vessel, and a small volume (~10 microliters) was transferred to a DEP device to confirm that bacteria could be collected by positive DEP at 5 MHz and 3 $V_{pp}$. The DEP device was made by securing a rubber o-ring above a microelectrode array microfabricated on a glass microscope slide with quick-set epoxy. The array had a castellated electrode geometry with a feature size of about 50 micrometers. The DEP signal was generated using a Red Pitaya device which was under computer control and amplified using an RF signal generator procured from Microcircuits.

EXAMPLE 6

We demonstrated that DEP could discriminate between bacteria and blood cells and concentrate microbes into a microchamber where they could be detected. To achieve this, co-planar and interdigitated microelectrodes embedded in the chamber that is 50 μm high are energized with an AC electric signal having a frequency of 5 MHz and amplitude of at least 10 $V_{pp}$. The electrodes are 50 μm wide and spaced and are about 2 μm thick. In accordance with a preferred embodiment of the present invention a custom centrifuge tube so that clinically-relevant volumes (>10 mL) of biological specimens like blood required for diagnosing BSI can be analyzed.

In one preferred embodiment, the present invention includes a larger machine that holds many individual devices, within which the specimen is processed. One novel feature of the device is that it includes a density medium that is layered atop a gel plug that separates a larger compartment from smaller compartments located at the bottom of the device. The gel plug is included so that biological particles that migrate to the bottom of the device during centrifugation come to rest on the semi-rigid gel, thereby minimizing the risk that target biological particles become immobilized on the surface of the device and cannot be detected or recovered.

In another preferred embodiment, the present device allows for inertial forces generated by centrifugation, drag generated by fluid flow, and electrokinetic forces to be applied along one or more spatial dimensions with time-varying magnitude defined by the operator. As is illustrated in the drawings of the invention, the device enables operators to fractionate and separate mixtures of biological particles by controlling the angular velocity of the device, the pressure exerted on the suspending fluid, the frequency of the electric signal, the magnitude of the applied electrical potential, the geometric configuration of the physical chambers defining the fluid path, and the geometric configuration of electrode structures embedded within the chambers. Importantly, the device is designed such that fractionation may occur in one or more of the compartments within the device, depending on the intended use of the device.

In another preferred embodiment, the device that is the present invention manifests biological particles of interest that can be extracted from the device by way of a small access port that is sealed so that there is no need for an active valve mechanism to be built into the device; flow out of the port can be controlled upstream in the device by applying pressure and the effluent can be collected in another vessel.

Yet another preferred embodiment, the device harbors biological particles of interest that can, in a single device, be separated from the original sample matrix using centrifugation, concentrated using the combined action of fluid flow and electrokinetic trapping, detected using at least one non-disruptive transduction mechanism, such as optical microscopy, calorimetry, electroenzymatic reactions, bio- or chemiluminescence or electroluminescence, or electrochemical impedance spectroscopy, for example, and then finally the biological particles can be recovered from the device.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the later issued claims.

The invention claimed is:

1. An apparatus for isolating subject particles in a sample comprising:
   a. a container having a proximal closed end with sealed access port through which sample may be delivered into the container;
   b. a material disposed above the distal end of the container in temporary fluid blocking position to an orifice disposed at the distal end of the container;
   c. a separation medium disposed adjacent the material and extended over a cross sectional volume of the container on the proximal side of the material within the container;
   d. the material adapted to support a concentrate of the sample after passing through the separation medium when the container is exposed to a centrifugal force;
   e. a heating element for liquefying the material and removing it from the fluid blocking position for fluid flow through the container out the orifice; and
   f. a chamber having at least one activatable electrode array, the chamber disposed in fluid communication with the container through the orifice for flow of the concentrate in the presence of the activated electrode array for generating electrokinetic effects to retain subject particles within the chamber.

2. The apparatus as claimed in claim 1 wherein the separation medium has an electrical conductivity lower than that of the sample and physical density greater than that of the sample.

3. The apparatus as claimed in claim 1 further comprising a hollow needle through the port having an angled end protruding into the container toward a sidewall of the container.

4. The apparatus as claimed in claim 1 where in the material is a meltable gel.

5. The apparatus as claimed in claim 1 wherein the material is a coating on the lower inside surface of the container covering the orifice.

6. The apparatus as claimed in claim 1 further comprising a mount for controlled spinning of the container and fluid engagement between the chamber and the container.

7. A method for isolating particles in a sample, the method comprising:
   a. providing a first elongated container having a port through a sealed proximal end for delivering a sample into the container having a separation medium disposed adjacent a meltable material, the meltable material positioned on the bottom and side surface of the distal end of the container above and an orifice at the distal end of the container;
   b. concentrating the particles by exposing it to centrifugal force to pass it through the separation medium and rest the concentrate on the meltable material;
   c. heating the meltable material and flushing it through the container out the orifice into a chamber in fluid communication with the container; and
   d. activating an electrode in the chamber for attracting and holding subject particles in the sample to the electrode.

8. The method for isolating particles in a sample, as claimed in claim 7 wherein the port is a hollow lumen positioned in the proximal end of the container.

9. The method for isolating particles in a sample, as claimed in claim 7 further comprising the step of pressurizing the container and forcing the sample through the orifice after centrifugation.

10. The method for isolating particles in a sample, as claimed in claim 7 further comprising pre-determined automated control of steps b, c and d.

11. The method for isolating particles in a sample, as claimed in claim 7 further comprising the step of delivering a sample into the container through a septum in a tube containing the sample with a needle disposed in the proximal end of the container.

12. The method for isolating particles in a sample, as claimed in claim 7 further comprising the steps of holding the particles against the first electrode for a pre-determined period of time followed by either pressurized flow or centrifugation of the device to transport the particles past a second activated electrode for attracting and holding the subject particles to the second electrode to concentrate the particles.

13. The method for isolating particles in a sample, as claimed in claim 7 further comprising pneumatic pressure applied to the proximal end of the container and/or volume forces applied to actuate fluid motion.

14. A system for isolating particles comprising:
   a. a first container having a sealed access port at the proximal end through which sample may be delivered into the container through a hollow tube;
   b. a gel disposed above the distal end of the container in temporary fluid blocking position to an orifice disposed at the distal end of the container;

c. a separation medium having lower electrical conductivity and higher physical density than the sample disposed adjacent the gel on the proximal side of the gel within the container through which the sample may pass;
d. the gel adapted to receive a concentrate of the sample through the separation medium when the container is exposed to a centrifugal force;
e. a heating element for melting the gel and removing it from the fluid blocking position for fluid flow through the container out the orifice; and
f. a second container having a microchamber with at least two activatable electrode arrays downstream of the first container orifice, the microchamber disposed in fluid communication with the container through the orifice for pressurized flow of a biological material in the presence of a first activatable electrode array for a pre-determined period of time to attract and hold subject particles against the first activatable electrode array followed by either fluid flow and/or centrifugal force past a second activatable electrode array for attracting and holding subject particles to the second activatable electrode array.

15. The system for isolating bacterial particles as claimed in claim 14 wherein the microchamber comprises a sandwiched flat array of electrodes adhered to a plate having an etched opening together forming a fluid flow path in which the particles flow past the arrays under pressure.

16. The system for isolating particles as claimed in claim 14 further comprising a cap for placement over the access port.

17. The system for isolating particles as claimed in claim 14 further comprising electrical contacts on the outside of the second container for electrical contact with the electrode arrays and external electronic instrumentation.

18. The system for isolating particles as claimed in claim 14 further comprising interdigitated electrodes.

19. The system for isolating particles as claimed in claim 14 further comprising electrodes coated in blackened platinum or an electrically conductive polymeric material.

20. The system for isolating particles as claimed in claim 14 further comprising multiple electrode arrays that can be individually addressed.

* * * * *